United States Patent
Yu et al.

(10) Patent No.: US 11,252,771 B2
(45) Date of Patent: Feb. 15, 2022

(54) DUPLICATE TRANSMISSION METHOD AND RELATED DEVICE

(71) Applicant: Huawei Technologies Co., Ltd., Shenzhen (CN)

(72) Inventors: Feng Yu, Beijing (CN); Xin Xiong, Beijing (CN); Bo Lin, Beijing (CN); Haifeng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 16/673,028

(22) Filed: Nov. 4, 2019

(65) Prior Publication Data

US 2020/0068637 A1     Feb. 27, 2020

Related U.S. Application Data

(63) Continuation of application No. PCT/CN2018/085734, filed on May 4, 2018.

(30) Foreign Application Priority Data

May 5, 2017   (CN) .......................... 201710314127.4

(51) Int. Cl.
*H04W 76/15* (2018.01)
*H04L 1/16* (2006.01)
(Continued)

(52) U.S. Cl.
CPC ........... *H04W 76/15* (2018.02); *H04L 1/1628* (2013.01); *H04W 80/02* (2013.01); *H04W 80/08* (2013.01); *H04W 84/20* (2013.01)

(58) Field of Classification Search
CPC ..... H04W 76/15; H04W 80/02; H04W 80/08; H04W 84/20; H04W 28/10; H04L 1/1628; H04L 1/08; H04L 1/22
See application file for complete search history.

(56) References Cited

U.S. PATENT DOCUMENTS 10,966,126 B2 * 3/2021 Kim ...................... H04W 76/10
2014/0294179 A1  10/2014 Sammour et al.
(Continued)

FOREIGN PATENT DOCUMENTS

CN         103888222 A     6/2014
CN         105144830 A    12/2015
(Continued)

OTHER PUBLICATIONS

Huawei et al.: "Support of Multi-Connectivity in NR", 3GPP TSG-RAN WG2 #97; R2-1701215, Feb. 13-17, 2017, 4 pages, Athens, Greece.
(Continued)

*Primary Examiner* — Michael K Phillips
(74) *Attorney, Agent, or Firm* — Slater Matsil, LLP

(57) ABSTRACT

A method includes: receiving, a target serial number transmitted by a second access network device, where the target serial number is obtained based on a first serial number, the first serial number is a serial number of a first RLC SDU successfully received by the second access network device, the first access network device, the second access network device, and a terminal device each include an RLC entity of a split bearer, a transmission mode of the split bearer is duplicate transmission, and the RLC entities of the split bearer are in an acknowledged mode AM; obtaining a second serial number based on the target serial number, where the second serial number is a serial number of a second RLC SDU, and the first RLC SDU is the same as the second RLC SDU; and marking the second serial number as a successfully received state.

16 Claims, 21 Drawing Sheets

(51) Int. Cl.
*H04W 80/02* (2009.01)
*H04W 80/08* (2009.01)
*H04W 84/20* (2009.01)

(56) References Cited

U.S. PATENT DOCUMENTS

| | | | |
|---|---|---|---|
| 2016/0044735 A1* | 2/2016 | Ohta | H04W 76/15 455/422.1 |
| 2016/0057585 A1* | 2/2016 | Horn | H04L 45/245 370/312 |
| 2016/0219458 A1* | 7/2016 | Kubota | H04W 28/0273 |
| 2016/0255619 A1 | 9/2016 | Yi et al. | |
| 2016/0286412 A1* | 9/2016 | Kim | H04W 72/0406 |
| 2017/0006484 A1* | 1/2017 | Lee | H04W 28/08 |
| 2018/0279168 A1* | 9/2018 | Jheng | H04W 28/04 |
| 2019/0289496 A1* | 9/2019 | Shim | H04W 28/06 |
| 2019/0327623 A1 | 10/2019 | LIU et al. | |
| 2020/0059821 A1* | 2/2020 | Wirth | H04L 5/0094 |
| 2020/0077308 A1* | 3/2020 | Kim | H04W 36/0055 |
| 2020/0187282 A1* | 6/2020 | Yu | H04L 1/18 |

FOREIGN PATENT DOCUMENTS

| | | |
|---|---|---|
| CN | 105659690 A | 6/2016 |
| CN | 105706387 A | 6/2016 |
| CN | 106559184 A | 4/2017 |
| EP | 3567895 A1 | 11/2019 |
| KR | 101488015 B1 | 1/2015 |
| RU | 2392752 C2 | 6/2010 |
| WO | 2015171053 A1 | 11/2015 |
| WO | 2018127057 A1 | 7/2018 |

OTHER PUBLICATIONS

Ericsson: "RLC transmission modes for Upper layer aggregation", 3GPP TSG-RAN WG2 #97, Tdoc R2-1700841, Feb. 13-17, 2017, 3 pages, Athens, Greece.

Nokia et al.: "PDCP handling of UM split bearer", 3GPP TSG-RAN WG2 Meeting #97bis R2-1703559, Apr. 3-7, 2017, 7 pages, Spokane, USA.

Huawei, HiSilicon: "Discussion on skew issue for split bear", 3GPP TSG-RAN WG2 Meeting #86, R2-142094, Seoul, South Korea, May 19-23, 2014. 6 pages.

ZTE, ZTE Microelectronics, "Consideration on the support of URLLC in NR", 3GPP TSG-RAN WG2 Meeting #96, R2-168473, Nov. 14-18, 2016, 6 pages, Reno, USA.

Huawei et al., "PDCP ARQ Function", 3GPP TSG-RAN WG2 # 97bis, R2-1702610 , Apr. 3-7, 2017, 2 pages, Spokane, Washington, USA.

"3rd Generation Partnership Project; Technical Specification Group Radio Access Network; NR; Radio Resource Control (RRC); Protocol specification (Release 15)", 3GPPTS 38.331 V0.0.2 (Mar. 2017), 13 pages.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.1.0 (May 2017), 13 pages.

"3rd Generation Partnership Project; Technical Specification Group Radio Access Network; [5G NR]; Packet Data Convergence Protocol (PDCP) specification (Release 15)", 3GPP TS 38.323 Vx.y.z (yyyy-mm), 8 pages.

Huawei et al.: "L2 Reordering and Retransmission Functions", 3GPP TSG-RAN WG2 Meeting #95bis R2-166195, Oct. 9, 2016 (Oct. 9, 2016), 5 pages, Kaohsiung.

NEC Corporation: "Transmission status and acceptable buffer size", 3GPP TSG RAN3 Meeting #84; R3-141278, May 18, 2014 (May 18, 2014), 5 pages, Seoul, Korea.

* cited by examiner

DUPLICATE TRANSMISSION METHOD AND RELATED DEVICE

CROSS-REFERENCE TO RELATED APPLICATIONS

This application is a continuation of International Application No. PCT/CN2018/085734, filed on May 4, 2018, which claims priority to Chinese Patent Application No. 201710314127.4, filed on May 5, 2017. The disclosures of the aforementioned applications are hereby incorporated by reference in their entireties.

TECHNICAL FIELD

This application relates to the field of communications technologies, and in particular, to a duplicate transmission method and a related device.

BACKGROUND

The 5G era has arrived. Compared with a 4G network, a 5G network has an important application scenario of ultra-reliable and low latency communication URLLC. This scenario requires that air interface data is transmitted at a reliability of 99.999% within a transmission latency of 1 millisecond, thereby providing strong support for intelligent manufacturing, remote mechanical control, assisted driving, automated driving, and other services.

To enhance reliability of transmission, a method for ensuring reliability through redundant transmission is put forward in 5G standards. Duplicate transmission based on a split bearer is one of methods that have been adopted in the standards. For example, FIG. 1 is a schematic structural diagram of duplicate transmission based on a split bearer in a case of dual connectivity. The dual connectivity means that a terminal device can communicate with a master access network device and a secondary access network device simultaneously. The master access network device may be an MeNB (master eNB), and the secondary access network device may be an SeNB (secondary eNB). As shown in FIG. 1, the terminal device, the master access network device, and the secondary access network device each include a packet data convergence protocol (PDCP) layer, a radio link control (RLC) layer, a media access control (MAC) layer, and a physical layer (PHY).

In the 5G standards, a split bearer is split at a PDCP layer. As shown in FIG. 1, using uplink transmission as an example, a PDCP entity of the terminal device simultaneously delivers a PDCP PDU to a third RLC entity of the master access network device through a second RLC entity and to a fourth RLC entity of the secondary access network device through a first RLC entity, so that reliability is ensured by allowing a packet to be transmitted on a plurality of paths simultaneously. Duplicate transmission based on a split bearer in other connectivity cases is similar.

In the 5G standards, an RLC entity enables an acknowledged mode (AM). When packet loss is detected, an RLC entity in the AM can request an RLC entity at a transmit end to retransmit a packet. This is an automatic repeat request (ARQ) mechanism.

In practice, it is found that if all RLC entities of a split bearer are in the AM mode, a packet may be transmitted successfully on some paths, but be transmitted unsuccessfully on some other paths and consequently retransmitted. For example, FIG. 2 is a schematic flowchart of a duplicate transmission based on a split bearer in a case of dual connectivity, and uplink transmission is used as an example in FIG. 2. As shown in FIG. 2, a process of duplicate transmission based on a split bearer in the case of dual connectivity may include the following steps 201 to 207.

201. After generating a PDCP protocol data unit (PDU), a first PDCP entity of a terminal device delivers the PDCP PDU to a first RLC entity and a second RLC entity of a split bearer simultaneously. All RLC entities of the split bearer are in an AM. The PDCP PDU received by the first RLC entity is referred to as a first RLC SDU, and the PDCP PDU received by the second RLC entity is referred to as a second RLC SDU. To be specific, the first RLC SDU is the same as the second RLC SDU.

202. The first RLC entity generates a serial number of the first RLC SDU (that is, an SN number of the first RLC SDU), and generates a first RLC PDU based on the first RLC SDU, and the second RLC entity generates a serial number of the second RLC SDU (that is, an SN number of the second RLC SDU), and generates a second RLC PDU based on the second RLC SDU.

203. The second RLC entity of the terminal device successfully transmits the second RLC PDU and the serial number of the second RLC SDU to a third RLC entity. The third RLC entity obtains the second RLC SDU based on the second RLC PDU, and transmits the RLC SDU to a second PDCP entity, and the second PDCP entity obtains the PDCP PDU.

204. The first RLC entity of the terminal device transmits the first RLC PDU to a fourth RLC entity unsuccessfully.

205. If a status report trigger condition is met, the third RLC entity transmits a status report to the second RLC entity. The status report indicates that the second RLC PDU is successfully received. The second RLC entity does not retransmit the second RLC PDU after receiving the status report.

206. If the status report trigger condition is met, the fourth RLC entity transmits a status report to the first RLC entity. However, this status report includes the SN number of the first RLC SDU.

207. After receiving the status report, the first RLC entity of the terminal device retransmits the first RLC PDU until the first RLC PDU is successfully transmitted.

In the duplicate transmission, the same PDCP PDU is transmitted on each path of the terminal device, but it is sufficient to successfully transmit the PDCP PDU on only one path. However, in an existing transmission mechanism, after transmission succeeds on one path, retransmission on another path is still attempted repeatedly, resulting in waste of air interface overheads. In addition, a priority of retransmitting a PDU at an RLC layer is always higher than that of initially transmitting the PDU. Consequently, subsequent transmission of a new PDU is blocked and a transmission latency is increased.

SUMMARY

Embodiments of this application provide a duplicate transmission method and a related device, to help save air interface resources and reduce a transmission latency.

According to a first aspect, an embodiment of this application provides a duplicate transmission method, including: receiving, by a first access network device, a target serial number transmitted by a second access network device, where the target serial number is obtained based on a first serial number, the first serial number is a serial number of a first radio link control service data unit RLC SDU successfully received by the second access network device, the first access network device, the second access network device, and a terminal device each include an RLC entity of a split bearer, a transmission mode of the split bearer is duplicate transmission, and the RLC entities of the split bearer are in an acknowledged mode AM; obtaining, by the first access network device, a second serial number based on the target serial number, where the second serial number is a serial number of a second RLC SDU, and the first RLC SDU is the same as the second RLC SDU; and marking, by the first access network device, the second serial number as a successfully received state.

It can be learned that, by implementing the method described in the first aspect, the first RLC SDU is the same as the second RLC SDU. After successfully receiving the first RLC SDU, the second access network device transmits, to the first access network device, the target serial number obtained based on the serial number of the first RLC SDU. In this way, the first access network device can determine the second serial number (that is, the serial number of the second RLC SDU), and mark the second RLC SDU as the successfully received state. Further, even if the first access network device does not successfully receive the second RLC SDU, a transmit end is not required to retransmit a second RLC PDU corresponding to the second RLC SDU. Therefore, by implementing the method described in the first aspect, waste of air interface overheads is reduced, and a transmission latency is reduced.

Optionally, the target serial number is the first serial number, or the target serial number is a packet data convergence protocol PDCP serial number corresponding to the first serial number.

Optionally, a specific implementation of obtaining the second serial number by the first access network device based on the target serial number may be: determining, by the first access network device, that the target serial number is the second serial number. Through this implementation, the second serial number can be determined accurately.

Optionally, the target serial number is the PDCP serial number, and a specific implementation of obtaining the second serial number by the first access network device based on the target serial number may be: determining, by the first access network device based on a prestored correspondence between the PDCP serial number and a serial number of an RLC SDU, that a serial number corresponding to the target serial number is the second serial number. Through this implementation, the second serial number can be determined accurately.

Optionally, after marking the second serial number as the successfully received state, the first access network device may further transmit a status report not including the second serial number to the terminal device. Through this implementation, even if the first access network device does not successfully receive the second RLC SDU after the terminal device receives the status report that does not include the second serial number, the transmit end is not required to retransmit the second RLC PDU corresponding to the second RLC SDU, thereby helping reduce waste of air interface overheads and reduce a transmission latency.

According to a second aspect, an embodiment of this application provides a duplicate transmission method, including: receiving, by a PDCP entity of a first device, a first serial number transmitted by a first RLC entity of the first device, where the first serial number is a serial number of a first radio link control service data unit RLC SDU successfully received by the first RLC entity, a split bearer corresponding to the PDCP entity includes the first RLC entity and a second RLC entity, a transmission mode of the split bearer is duplicate transmission, and the RLC entities of the split bearer are in an acknowledged mode AM; and transmitting, by the PDCP entity, a target serial number to the second RLC entity of the first device based on the first serial number, where the target serial number is used for the second RLC entity to determine a second serial number and to mark the second serial number as a successfully received state, the second serial number is a serial number of a second RLC SDU, and the first RLC SDU is the same as the second RLC SDU.

It can be learned that, by implementing the method described in the second aspect, the first RLC SDU is the same as the second RLC SDU, and after successfully receiving the first RLC SDU, the first RLC entity of the first device transmits the first serial number to the PDCP entity of the first device. Based on the first serial number, the PDCP entity transmits the target serial number to the second RLC entity of the first device. In this way, the second RLC entity of the first device can determine the second serial number (that is, the serial number of the second RLC SDU) based on the target serial number, and mark the second RLC SDU as the successfully received state. Further, even if the second RLC entity does not successfully receive the second RLC SDU, a transmit end is not required to retransmit a second RLC PDU corresponding to the second RLC SDU. Therefore, by implementing the method described in the second aspect, waste of air interface overheads is reduced, and a transmission latency is reduced.

Optionally, the target serial number is the first serial number, or the target serial number is a packet data convergence protocol PDCP serial number corresponding to the first serial number.

Optionally, the target serial number is used for the second RLC entity to determine that the target serial number is the second serial number of the second PDU. Through this implementation, the second serial number can be determined accurately.

Optionally, the target serial number is the PDCP serial number, and the PDCP serial number is used for the second RLC entity to determine, based on a prestored correspondence between the PDCP serial number and a serial number of an RLC SDU, that a serial number corresponding to the target serial number is the second serial number. Through this implementation, the second serial number can be determined accurately.

Optionally, an RLC entity of the split bearer is further located in a second device, and the second RLC entity is configured to transmit, after marking the second serial number as the successfully received state, a status report not including the second serial number to the second device. Through this implementation, even if the second RLC entity does not successfully receive the second RLC SDU after the second device receives the status report that does not include the second serial number, the second device is not required to retransmit the second RLC SDU, thereby helping reduce waste of air interface overheads and reduce a transmission latency.

According to a third aspect, an embodiment of this application provides a duplicate transmission method, including: receiving, by a first access network device, a target serial number transmitted by a second access network device, where the target serial number is obtained based on a first serial number, the first serial number is a serial number of a first radio link control service data unit RLC SDU successfully transmitted by the second access network device to a terminal device, the first access network device, the second access network device, and the terminal device each include an RLC entity of a split bearer, a transmission mode of the split bearer is duplicate transmission, and the RLC entities of the split bearer are in an acknowledged mode AM; obtaining, by the first access network device, a second serial number based on the target serial number, where the second serial number is a serial number of a second RLC SDU, and the first RLC SDU is the same as the second RLC SDU; and transmitting, by the first access network device, the second serial number to the terminal device, where the second serial number is used for the terminal device to mark the second serial number as a successfully received state.

It can be learned that, by implementing the method described in the third aspect, the first RLC SDU is the same as the second RLC SDU. After successfully transmitting the first RLC SDU, the second access network device transmits, to the first access network device, the target serial number obtained based on the serial number of the first RLC SDU. In this way, the first access network device can determine the second serial number (that is, the serial number of the second RLC SDU), and transmit the second serial number to the terminal device, so that the terminal device marks the second serial number as the successfully received state. Further, even if the terminal device does not successfully receive the second RLC SDU, the first access network device is not required to retransmit a second RLC PDU corresponding to the second RLC SDU. Therefore, by implementing the method described in the third aspect, waste of air interface overheads is reduced, and a transmission latency is reduced.

Optionally, the target serial number is the first serial number, or the target serial number is a packet data convergence protocol PDCP serial number corresponding to the first serial number.

Optionally, a specific implementation of obtaining the second serial number by the first access network device based on the target serial number may be: determining, by the first access network device, that the target serial number is the second serial number. Through this implementation, the second serial number can be determined accurately.

Optionally, the target serial number is the PDCP serial number, and a specific implementation of obtaining the second serial number by the first access network device based on the target serial number may be: determining, by the first access network device based on a prestored correspondence between the PDCP serial number and a serial number of an RLC SDU, that a serial number corresponding to the target serial number is the second serial number. Through this implementation, the second serial number can be determined accurately.

According to a fourth aspect, an embodiment of this application provides a duplicate transmission method, including: receiving, by a PDCP entity of a first device, a first serial number transmitted by a first RLC entity of the first device, where the first serial number is a serial number of a first radio link control service data unit RLC SDU successfully transmitted by the first RLC entity to a fourth RLC entity, a split bearer corresponding to the PDCP entity includes the first RLC entity of the first device, a second RLC entity of the first device, a third RLC entity of a third device, and the fourth RLC entity of a second device, a transmission mode of the split bearer is duplicate transmission, and the RLC entities of the split bearer are in an acknowledged mode AM; and transmitting, by the PDCP entity, a target serial number to the second RLC entity based on the first serial number, where the target serial number is used for the second RLC entity to determine a second serial number and to transmit the second serial number to the third RLC entity, the second serial number is a serial number of a second RLC SDU, the first RLC SDU is the same as the second RLC SDU, and the second serial number is used for the third RLC entity to mark the second serial number as a successfully received state.

It can be learned that, by implementing the method described in the fourth aspect, the first RLC SDU is the same as the second RLC SDU. After successfully transmitting the first RLC SDU to the fourth RLC entity of the second device, the first RLC entity of the first device transmits the first serial number (that is, the serial number of the first RLC SDU) to the PDCP entity of the first device. Based on the first serial number, the PDCP entity of the first device transmits the target serial number to the second RLC entity. In this way, the second RLC entity can determine the second serial number (that is, the serial number of the second RLC SDU) based on the target serial number, and transmit the second serial number to the third RLC entity of the third device, and then the third RLC entity can mark the second serial number as the successfully received state. Further, even if the third RLC entity does not successfully receive the second RLC SDU, the second RLC entity is not required to retransmit a second RLC PDU corresponding to the second RLC SDU. Therefore, by implementing the method described in the fourth aspect, waste of air interface overheads is reduced, and a transmission latency is reduced.

Optionally, the target serial number is the first serial number, or the target serial number is a PDCP serial number corresponding to the first serial number.

Optionally, the target serial number is used for the second RLC entity to determine that the target serial number is the second serial number. Through this implementation, the second serial number can be determined accurately.

Optionally, the target serial number is the PDCP serial number, and the target serial number is used for the second RLC entity to determine, based on a prestored correspondence between the PDCP serial number and a serial number of an RLC SDU, that a serial number corresponding to the target serial number is the second serial number. Through this implementation, the second serial number can be determined accurately.

According to a fifth aspect, an embodiment of this application provides a duplicate transmission configuration method, including: configuring, by a master access network device, a radio link control RLC entity of a split bearer in the master access network device to an unacknowledged mode UM, where RLC entities of the split bearer are located in the master access network device, a secondary access network device, and a terminal device separately; transmitting, by the master access network device, indication information to the secondary access network device, where the indication information is used to indicate that a transmission mode of the split bearer is duplicate transmission, and the indication information is used to configure the RLC entity of the split bearer in the secondary access network device to the UM; and transmitting, by the master access network device, indication information to the terminal device, where the indication information is used for the terminal device to perform duplicate transmission.

In actual application, an RLC entity works in a UM mode or an AM mode. When packet loss is detected, the RLC entity in the AM can request an RLC entity at a transmit end to retransmit a packet. This is an automatic repeat request (ARQ) mechanism. The UM mode can support detection of packet loss and provide sorting and reassembly of packets. However, when packet loss is detected, the RLC entity in the UM does not request the RLC entity at the transmit end to retransmit the packet. It can be learned that, by implementing the method described in the fifth aspect, if the split bearer is based on duplicate transmission and the RLC entities of the split bearer are in the AM mode, the master access network device may indicate, after configuring the RLC entity of the split bearer in the master access network device to the UM, that the split bearer of the secondary access network device is based on duplicate transmission, so that the secondary access network device can also configure the RLC entity of the split bearer in the secondary access network device to the UM. After the RLC entities of the split bearer in the master access network device and the secondary access network device are configured to the UM, if the RLC entity of the master access network device does not successfully receive an RLC PDU, the RLC entity does not request the transmit end to retransmit the RLC PDU not successfully received. Similarly, if the RLC entity of the secondary access network device does not successfully receive an RLC PDU, the RLC entity does not request the transmit end to retransmit the RLC PDU not successfully received. Therefore, by implementing the method described in the fifth aspect, waste of air interface overheads is reduced, and a transmission latency is reduced.

Optionally, the master access network device receives first configuration information transmitted by the secondary access network device, where the first configuration information indicates that a mode of the RLC entity of the split bearer in the secondary access network device is the UM. The master access network device transmits the first configuration information and second configuration information to the terminal device, where the second configuration information indicates that a mode of the RLC entity of the split bearer in the master access network device is the UM, and the first configuration information and the second configuration information are used to configure a mode of the RLC entity of the split bearer in the terminal device to the UM.

Through this implementation, after receiving the first configuration information and the second configuration information that are transmitted by the master access network device, the terminal device configures the modes of the first RLC entity and the second RLC entity to the UM. Therefore, when the RLC entity of the terminal device does not successfully receive the RLC PDU, the transmit end is not required to retransmit the RLC PDU, thereby reducing waste of air interface overheads and reducing a transmission latency.

According to a sixth aspect, an embodiment of this application provides a duplicate transmission configuration method, including: receiving, by a secondary access network device, indication information transmitted by a master access network device, where the indication information is used to indicate that a transmission mode of a split bearer is duplicate transmission, and RLC entities of the split bearer are located in the master access network device, the secondary access network device, and a terminal device separately; and configuring, by the secondary access network device, the RLC entity of the split bearer in the secondary access network device to an unacknowledged mode UM.

It can be learned that, by implementing the method described in the sixth aspect, if the split bearer is based on duplicate transmission and the RLC entities of the split bearer are in the AM mode, the master access network device may indicate, after configuring the RLC entity of the split bearer in the master access network device to the UM, that the split bearer of the secondary access network device is based on duplicate transmission, so that the secondary access network device can also configure the RLC entity of the split bearer in the secondary access network device to the UM. After the RLC entities of the split bearer in the master access network device and the secondary access network device are configured to the UM, if the RLC entity of the master access network device does not successfully receive an RLC PDU, the RLC entity does not request a transmit end to retransmit the RLC PDU not successfully received. Similarly, if the RLC entity of the secondary access network device does not successfully receive an RLC PDU, the RLC entity does not request the transmit end to retransmit the RLC PDU not successfully received. Therefore, by implementing the method described in the sixth aspect, waste of air interface overheads is reduced, and a transmission latency is reduced.

Optionally, the secondary access network device transmits first configuration information to the master access network device, where the first configuration information indicates that a mode of the RLC entity of the split bearer in the secondary access network device is the UM.

According to a seventh aspect, an embodiment of this application provides a duplicate transmission configuration method, including: receiving, by a terminal device, indication information transmitted by a master access network device, where the indication information is used to indicate that a transmission mode of a split bearer is duplicate transmission, and RLC entities of the split bearer are located in the master access network device, a secondary access network device, and the terminal device separately; and performing, by the terminal device, duplicate transmission based on the indication information.

By implementing the method described in the seventh aspect, after receiving first configuration information and second configuration information that are transmitted by the master access network device, the terminal device configures modes of a first RLC entity and a second RLC entity to a UM. Therefore, when the RLC entity of the terminal device does not successfully receive an RLC PDU, a transmit end is not required to retransmit the RLC PDU, thereby reducing waste of air interface overheads and reducing a transmission latency.

Optionally, the terminal device receives first configuration information and second configuration information that are transmitted by the master access network device, where the first configuration information indicates that a mode of the RLC entity of the split bearer in the secondary access network device is an unacknowledged mode UM, and the second configuration information indicates that a mode of the RLC entity of the split bearer in the master access network device is the UM; and the terminal device configures a mode of the RLC entity of the split bearer in the terminal device to the UM.

According to an eighth aspect, an embodiment of this application provides a duplicate transmission configuration method, including: configuring, by a master access network device, a mode of a radio link control RLC entity of a split bearer in the master access network device to an unacknowledged mode UM, where RLC entities of the split bearer are located in the master access network device, a secondary access network device, and a terminal device separately, and a transmission mode of the split bearer is duplicate transmission; and transmitting, by the master access network device, second configuration information to the secondary access network device, where the second configuration information indicates that a mode of the RLC entity of the split bearer in the master access network device is the UM, and the second configuration information is used to configure the RLC entity of the split bearer in the secondary access network device to the UM.

By implementing the method described in the eighth aspect, if the split bearer is based on duplicate transmission and the RLC entities of the split bearer are in an AM mode, after the master access network device configures the RLC entity of the split bearer in the master access network device to the UM, the secondary access network device can also configure the RLC entity of the split bearer in the secondary access network device to the UM based on the configuration information of the master access network device. When packet loss is detected, the RLC entity in the UM does not request an RLC entity at a transmit end to retransmit a packet. Therefore, after the RLC entities of the split bearer in the master access network device and the secondary access network device are configured to the UM, if the RLC entity of the master access network device does not successfully receive an RLC PDU, the RLC entity does not request the transmit end to retransmit the RLC PDU not successfully received. Similarly, if the RLC entity of the secondary access network device does not successfully receive an RLC PDU, the RLC entity does not request the transmit end to retransmit the RLC PDU not successfully received. Therefore, by implementing the method described in the eighth aspect, waste of air interface overheads is reduced, and a transmission latency is reduced.

Optionally, the method further includes: receiving, by the master access network device, first configuration information transmitted by the secondary access network device, where the first configuration information indicates that a mode of the RLC entity of the split bearer in the secondary access network device is the UM; and transmitting, by the master access network device, the first configuration information and second configuration information to the terminal device, where the first configuration information and the second configuration information are used to configure a mode of the RLC entity of the split bearer in the terminal device to the UM.

According to a ninth aspect, an embodiment of this application provides a duplicate transmission configuration method, including: receiving, by a secondary access network device, second configuration information transmitted by a master access network device, where the second configuration information indicates that a mode of a radio link control RLC entity of a split bearer in the master access network device is an unacknowledged mode UM, RLC entities of the split bearer are located in the master access network device, the secondary access network device, and a terminal device separately, and a transmission mode of the split bearer is duplicate transmission; and configuring, by the secondary access network device, a mode of the RLC entity of the split bearer in the secondary access network device to the UM.

By implementing the method described in the ninth aspect, if the split bearer is based on duplicate transmission and the RLC entities of the split bearer are in an AM mode, after the master access network device configures the RLC entity of the split bearer in the master access network device to the UM, the secondary access network device can also configure the RLC entity of the split bearer in the secondary access network device to the UM based on the configuration information of the master access network device. When packet loss is detected, the RLC entity in the UM does not request an RLC entity at a transmit end to retransmit a packet. Therefore, after the RLC entities of the split bearer in the master access network device and the secondary access network device are configured to the UM, if the RLC entity of the master access network device does not successfully receive an RLC PDU, the RLC entity does not request the transmit end to retransmit the RLC PDU not successfully received. Similarly, if the RLC entity of the secondary access network device does not successfully receive an RLC PDU, the RLC entity does not request the transmit end to retransmit the RLC PDU not successfully received. Therefore, by implementing the method described in the ninth aspect, waste of air interface overheads is reduced, and a transmission latency is reduced.

Optionally, the secondary access network device transmits first configuration information to the master access network device, where the first configuration information indicates that a mode of the RLC entity of the split bearer in the secondary access network device is the UM.

According to a tenth aspect, an embodiment of this application provides a duplicate transmission configuration method, including: receiving, by a terminal device, first configuration information and second configuration information that are transmitted by a master access network device, where the first configuration information indicates that a mode of a radio link control RLC entity of a split bearer in a secondary access network device is an unacknowledged mode UM, the second configuration information indicates that a mode of an RLC entity of the split bearer in the master access network device is the UM, RLC entities of the split bearer are located in the master access network device, the secondary access network device, and the terminal device separately, and a transmission mode of the split bearer is duplicate transmission; and configuring, by the terminal device, a mode of the RLC entity of the split bearer in the terminal device to the UM.

By implementing the method described in the tenth aspect, after receiving the first configuration information and the second configuration information that are transmitted by the master access network device, the terminal device configures modes of a first RLC entity and a second RLC entity to the UM. Therefore, when the RLC entity of the terminal device does not successfully receive an RLC PDU, a transmit end is not required to retransmit the RLC PDU, thereby reducing waste of air interface overheads and reducing a transmission latency.

According to an eleventh aspect, an embodiment of this application provides a duplicate transmission configuration method, including: configuring, by a master access network device, modes of all RLC entities of a split bearer in the master access network device to a UM mode, where RLC entities of the split bearer are located in the master access network device and a terminal device separately, and a transmission mode of the split bearer is duplicate transmission; and transmitting, by the master access network device, first configuration information to the terminal device, where the first configuration information indicates that the modes of all the RLC entities of the split bearer in the master access network device are the UM, and the first configuration information is used to configure modes of all RLC entities of the split bearer in the terminal device to the UM.

It can be learned that, by implementing the method described in the eleventh aspect, if the split bearer is based on duplicate transmission and the RLC entities of the split bearer are in an AM mode, the master access network device may transmit, after configuring the RLC entities of the split bearer in the master access network device to the UM, the first configuration information of the master access network device to the terminal device, so that the terminal device can configure the RLC entities of the split bearer in the terminal device to the UM based on the first configuration information. When packet loss is detected, the RLC entity in the UM does not request an RLC entity at a transmit end to retransmit a packet. Therefore, after the RLC entities of the split bearer in the master access network device and the terminal device are configured to the UM, if an RLC entity of the master access network device does not successfully receive an RLC PDU, the RLC entity of the master access network device does not request the transmit end to retransmit the RLC PDU not successfully received. Similarly, if an RLC entity of the terminal device does not successfully receive an RLC PDU, the RLC entity of the terminal device does not request the transmit end to retransmit the RLC PDU not successfully received. Therefore, by implementing the method described in the eleventh aspect, waste of air interface overheads is reduced, and a transmission latency is reduced.

According to a twelfth aspect, an embodiment of this application provides a duplicate transmission configuration method, including: receiving, by a terminal device, first configuration information transmitted by a master access network device, where the first configuration information indicates that modes of all RLC entities of a split bearer in the master access network device are a UM, RLC entities of the split bearer are located in the master access network device and the terminal device separately, and a transmission mode of the split bearer is duplicate transmission; and configuring, by the terminal device, modes of all RLC entities of the split bearer in the terminal device to the UM.

It can be learned that, by implementing the method described in the twelfth aspect, if the split bearer is based on duplicate transmission and the RLC entities of the split bearer are in an AM mode, the master access network device may transmit, after configuring the RLC entities of the split bearer in the master access network device to the UM, the first configuration information of the master access network device to the terminal device, so that the terminal device can configure the RLC entities of the split bearer in the terminal device to the UM based on the first configuration information. When packet loss is detected, the RLC entity in the UM does not request an RLC entity at a transmit end to retransmit a packet. Therefore, after the RLC entities of the split bearer in the master access network device and the terminal device are configured to the UM, if an RLC entity of the master access network device does not successfully receive an RLC PDU, the RLC entity of the master access network device does not request the transmit end to retransmit the RLC PDU not successfully received. Similarly, if an RLC entity of the terminal device does not successfully receive an RLC PDU, the RLC entity of the terminal device does not request the transmit end to retransmit the RLC PDU not successfully received. Therefore, by implementing the method described in the twelfth aspect, waste of air interface overheads is reduced, and a transmission latency is reduced.

According to a thirteenth aspect, an access network device is provided. The access network device can implement the method according to the first aspect or a possible implementation of the first aspect. The functions can be implemented by hardware or by corresponding software executed by hardware. The hardware or software includes one or more units corresponding to the functions. The units may be software and/or hardware. For the principles and the beneficial effects of the access network device for resolving problems based on the same inventive concept, refer to the first aspect or a possible implementation of the first aspect and beneficial effects thereof. Repeated content is not described herein again.

According to a fourteenth aspect, a device is provided. The device can implement the method according to the second aspect or a possible implementation of the second aspect. The functions can be implemented by hardware or by corresponding software executed by hardware. The hardware or software includes one or more units corresponding to the functions. The units may be software and/or hardware. For the principles and the beneficial effects of the device for resolving problems based on the same inventive concept, refer to the second aspect or a possible implementation of the second aspect and beneficial effects thereof. Repeated content is not described herein again.

According to a fifteenth aspect, an access network device is provided. The access network device can implement the method according to the third aspect or a possible implementation of the third aspect. The functions can be implemented by hardware or by corresponding software executed by hardware. The hardware or software includes one or more units corresponding to the functions. The units may be software and/or hardware. For the principles and the beneficial effects of the access network device for resolving problems based on the same inventive concept, refer to the third aspect or a possible implementation of the third aspect and beneficial effects thereof. Repeated content is not described herein again.

According to a sixteenth aspect, a device is provided. The device can implement the method according to the fourth aspect or a possible implementation of the fourth aspect. The functions can be implemented by hardware or by corresponding software executed by hardware. The hardware or software includes one or more units corresponding to the functions. The units may be software and/or hardware. For the principles and the beneficial effects of the device for resolving problems based on the same inventive concept, refer to the fourth aspect or a possible implementation of the fourth aspect and beneficial effects thereof. Repeated content is not described herein again.

According to a seventeenth aspect, a master access network device is provided. The master access network device can implement the method according to the fifth aspect or a possible implementation of the fifth aspect. The functions can be implemented by hardware or by corresponding software executed by hardware. The hardware or software includes one or more units corresponding to the functions. The units may be software and/or hardware. For the principles and the beneficial effects of the master access network device for resolving problems based on the same inventive concept, refer to the fifth aspect or a possible implementation of the fifth aspect and beneficial effects thereof. Repeated content is not described herein again.

According to an eighteenth aspect, a secondary access network device is provided. The secondary access network device can implement the method according to the sixth aspect or a possible implementation of the sixth aspect. The functions can be implemented by hardware or by corresponding software executed by hardware. The hardware or software includes one or more units corresponding to the functions. The units may be software and/or hardware. For the principles and the beneficial effects of the secondary access network device for resolving problems based on the same inventive concept, refer to the sixth aspect or a possible implementation of the sixth aspect and beneficial effects thereof. Repeated content is not described herein again.

According to a nineteenth aspect, a terminal device is provided. The terminal device can implement the method according to the seventh aspect or a possible implementation of the seventh aspect. The functions can be implemented by hardware or by corresponding software executed by hardware. The hardware or software includes one or more units corresponding to the functions. The units may be software and/or hardware. For the principles and the beneficial effects of the terminal device for resolving problems based on the same inventive concept, refer to the seventh aspect or a possible implementation of the seventh aspect and beneficial effects thereof. Repeated content is not described herein again.

According to a twentieth aspect, a master access network device is provided. The master access network device can implement the method according to the eighth aspect or a possible implementation of the eighth aspect. The functions can be implemented by hardware or by corresponding software executed by hardware. The hardware or software includes one or more units corresponding to the functions. The units may be software and/or hardware. For the principles and the beneficial effects of the master access network device for resolving problems based on the same inventive concept, refer to the eighth aspect or a possible implementation of the eighth aspect and beneficial effects thereof. Repeated content is not described herein again.

According to a twenty-first aspect, a secondary access network device is provided. The secondary access network device can implement the method according to the ninth aspect or a possible implementation of the ninth aspect. The functions can be implemented by hardware or by corresponding software executed by hardware. The hardware or software includes one or more units corresponding to the functions. The units may be software and/or hardware. For the principles and the beneficial effects of the secondary access network device for resolving problems based on the same inventive concept, refer to the ninth aspect or a possible implementation of the ninth aspect and beneficial effects thereof. Repeated content is not described herein again.

According to a twenty-second aspect, a terminal device is provided. The terminal device can implement the method according to the tenth aspect or a possible implementation of the tenth aspect. The functions can be implemented by hardware or by corresponding software executed by hardware. The hardware or software includes one or more units corresponding to the functions. The units may be software and/or hardware. For the principles and the beneficial effects of the terminal device for resolving problems based on the same inventive concept, refer to the tenth aspect or a possible implementation of the tenth aspect and beneficial effects thereof. Repeated content is not described herein again.

According to a twenty-third aspect, a master access network device is provided. The master access network device can implement the method according to the eleventh aspect or a possible implementation of the eleventh aspect. The functions can be implemented by hardware or by corresponding software executed by hardware. The hardware or software includes one or more units corresponding to the functions. The units may be software and/or hardware. For the principles and the beneficial effects of the master access network device for resolving problems based on the same inventive concept, refer to the eleventh aspect or a possible implementation of the eleventh aspect and beneficial effects thereof. Repeated content is not described herein again.

According to a twenty-fourth aspect, a terminal device is provided. The terminal device can implement the method according to the twelfth aspect or a possible implementation of the twelfth aspect. The functions can be implemented by hardware or by corresponding software executed by hardware. The hardware or software includes one or more units corresponding to the functions. The units may be software and/or hardware. For the principles and the beneficial effects of the terminal device for resolving problems based on the same inventive concept, refer to the twelfth aspect or a possible implementation of the twelfth aspect and beneficial effects thereof. Repeated content is not described herein again.

According to a twenty-fifth aspect, an access network device is provided. The access network device includes: a processor, a memory, a communications interface, and one or more programs, where the processor, the communications interface, and the memory are connected; the one or more programs are stored in the memory, and the processor invokes a program stored in the memory to implement the solution in the first aspect or in a possible implementation of the first aspect. For the implementation and the beneficial effects of the access network device for resolving problems, refer to the first aspect or a possible implementation of the first aspect and the beneficial effects thereof. Repeated content is not described herein again.

According to a twenty-sixth aspect, a device is provided. The device includes: a processor, a memory, a communications interface, and one or more programs, where the processor, the communications interface, and the memory are connected; the one or more programs are stored in the memory, and the processor invokes a program stored in the memory to implement the solution in the second aspect or in a possible implementation of the second aspect. For the implementation and the beneficial effects of the device for resolving problems, refer to the second aspect or a possible implementation of the second aspect and the beneficial effects thereof. Repeated content is not described herein again.

According to a twenty-seventh aspect, an access network device is provided. The access network device includes: a processor, a memory, a communications interface, and one or more programs, where the processor, the communications interface, and the memory are connected; the one or more programs are stored in the memory, and the processor invokes a program stored in the memory to implement the solution in the third aspect or in a possible implementation of the third aspect. For the implementation and the beneficial effects of the access network device for resolving problems, refer to the third aspect or a possible implementation of the third aspect and the beneficial effects thereof. Repeated content is not described herein again.

According to a twenty-eighth aspect, a device is provided. The access network device includes: a processor, a memory, a communications interface, and one or more programs, where the processor, the communications interface, and the memory are connected; the one or more programs are stored in the memory, and the processor invokes a program stored in the memory to implement the solution in the fourth aspect or in a possible implementation of the fourth aspect. For the implementation and the beneficial effects of the device for resolving problems, refer to the fourth aspect or a possible implementation of the fourth aspect and the beneficial effects thereof. Repeated content is not described herein again.

According to a twenty-ninth aspect, a master access network device is provided. The master access network device includes: a processor, a memory, a communications interface, and one or more programs, where the processor, the communications interface, and the memory are connected; the one or more programs are stored in the memory, and the processor invokes a program stored in the memory to implement the solution in the fifth aspect or in a possible implementation of the fifth aspect. For the implementation and the beneficial effects of the master access network device for resolving problems, refer to the fifth aspect or a possible implementation of the fifth aspect and the beneficial effects thereof. Repeated content is not described herein again.

According to a thirtieth aspect, a secondary access network device is provided. The secondary access network device includes: a processor, a memory, a communications interface, and one or more programs, where the processor, the communications interface, and the memory are connected; the one or more programs are stored in the memory, and the processor invokes a program stored in the memory to implement the solution in the sixth aspect or in a possible implementation of the sixth aspect. For the implementation and the beneficial effects of the secondary access network device for resolving problems, refer to the sixth aspect or a possible implementation of the sixth aspect and the beneficial effects thereof. Repeated content is not described herein again.

According to a thirty-first aspect, a terminal device is provided. The terminal device includes: a processor, a memory, a communications interface, and one or more programs, where the processor, the communications interface, and the memory are connected; the one or more programs are stored in the memory, and the processor invokes a program stored in the memory to implement the solution in the seventh aspect or in a possible implementation of the seventh aspect. For the implementation and the beneficial effects of the terminal device for resolving problems, refer to the seventh aspect or a possible implementation of the seventh aspect and the beneficial effects thereof. Repeated content is not described herein again.

According to a thirty-second aspect, a master access network device is provided. The master access network device includes: a processor, a memory, a communications interface, and one or more programs, where the processor, the communications interface, and the memory are connected; the one or more programs are stored in the memory, and the processor invokes a program stored in the memory to implement the solution in the eighth aspect or in a possible implementation of the eighth aspect. For the implementation and the beneficial effects of the master access network device for resolving problems, refer to the eighth aspect or a possible implementation of the eighth aspect and the beneficial effects thereof. Repeated content is not described herein again.

According to a thirty-third aspect, a secondary access network device is provided. The secondary access network device includes: a processor, a memory, a communications interface, and one or more programs, where the processor, the communications interface, and the memory are connected; the one or more programs are stored in the memory, and the processor invokes a program stored in the memory to implement the solution in the ninth aspect or in a possible implementation of the ninth aspect. For the implementation and the beneficial effects of the secondary access network device for resolving problems, refer to the ninth aspect or a possible implementation of the ninth aspect and the beneficial effects thereof. Repeated content is not described herein again.

According to a thirty-fourth aspect, a terminal device is provided. The terminal device includes: a processor, a memory, a communications interface, and one or more programs, where the processor, the communications interface, and the memory are connected; the one or more programs are stored in the memory, and the processor invokes a program stored in the memory to implement the solution in the tenth aspect or in a possible implementation of the tenth aspect. For the implementation and the beneficial effects of the terminal device for resolving problems, refer to the tenth aspect or a possible implementation of the tenth aspect and the beneficial effects thereof. Repeated content is not described herein again.

According to a thirty-fifth aspect, a master access network device is provided. The master access network device includes: a processor, a memory, a communications interface, and one or more programs, where the processor, the communications interface, and the memory are connected; the one or more programs are stored in the memory, and the processor invokes a program stored in the memory to implement the solution in the eleventh aspect or in a possible implementation of the eleventh aspect. For the implementation and the beneficial effects of the master access network device for resolving problems, refer to the eleventh aspect or a possible implementation of the eleventh aspect and the beneficial effects thereof. Repeated content is not described herein again.

According to a thirty-sixth aspect, a secondary access network device is provided. The secondary access network device includes: a processor, a memory, a communications interface, and one or more programs, where the processor, the communications interface, and the memory are connected; the one or more programs are stored in the memory, and the processor invokes a program stored in the memory to implement the solution in the twelfth aspect or in a possible implementation of the twelfth aspect. For the implementation and the beneficial effects of the secondary access network device for resolving problems, refer to the twelfth aspect or a possible implementation of the twelfth aspect and the beneficial effects thereof. Repeated content is not described herein again.

According to a thirty-seventh aspect, a computer storage medium is provided. The computer storage medium stores program code, and the program code can be used to instruct to perform the method in any one of the first aspect to the twelfth aspect, or any optional implementation of any method in the first aspect to the twelfth aspect.

According to a thirty-eighth aspect, a computer program product is provided. When the computer program product is run on a computer, the computer is enabled to perform the method in any one of the first aspect to the twelfth aspect, or any optional implementation of any method in the first aspect to the twelfth aspect.

DETAILED DESCRIPTION OF ILLUSTRATIVE EMBODIMENTS

The following further describes specific embodiments of this application in detail with reference to accompanying drawings.

In the foregoing embodiments, the description of each embodiment has respective focuses. For a part that is not described in detail in an embodiment, refer to related descriptions in other embodiments.

To better understand the embodiments of this application, communications systems to which the embodiments of this application are applicable are described below.

Figure 1:
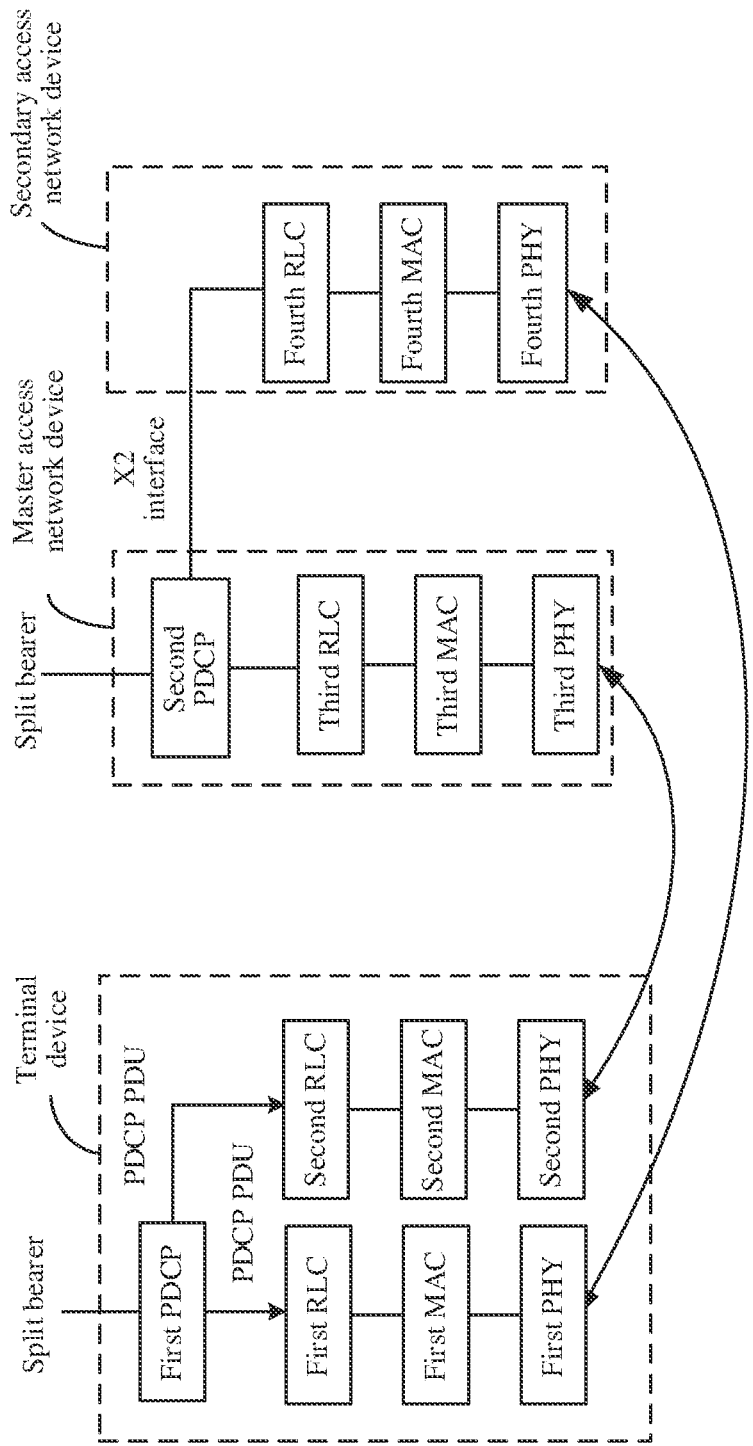
FIG. 1 is a schematic structural diagram of duplicate transmission based on a split bearer in a case of dual connectivity in the prior art.
Figure 2:
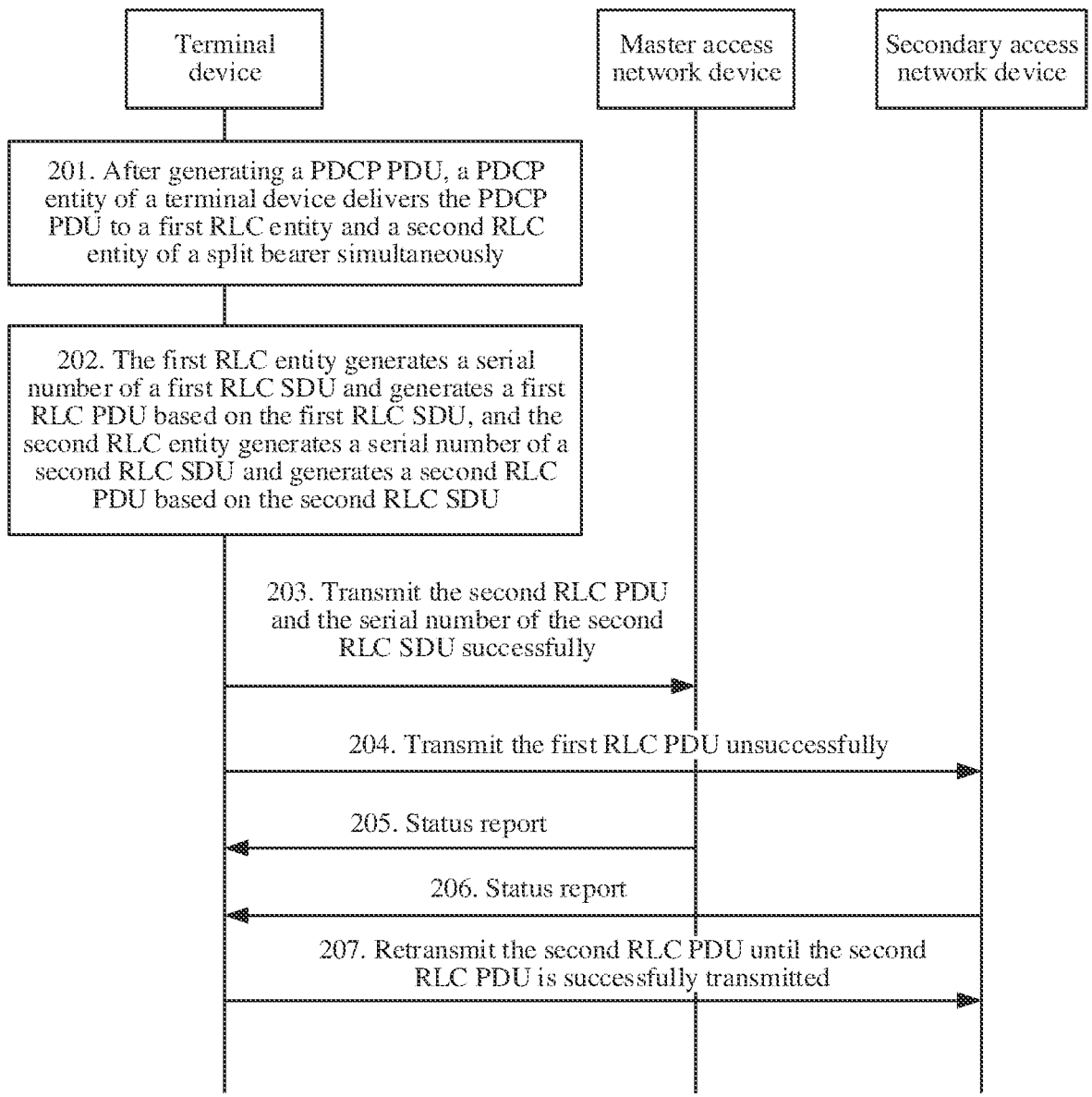
FIG. 2 is a schematic flowchart of duplicate transmission based on a split bearer in a case of dual connectivity in the prior art.
Figure 3:
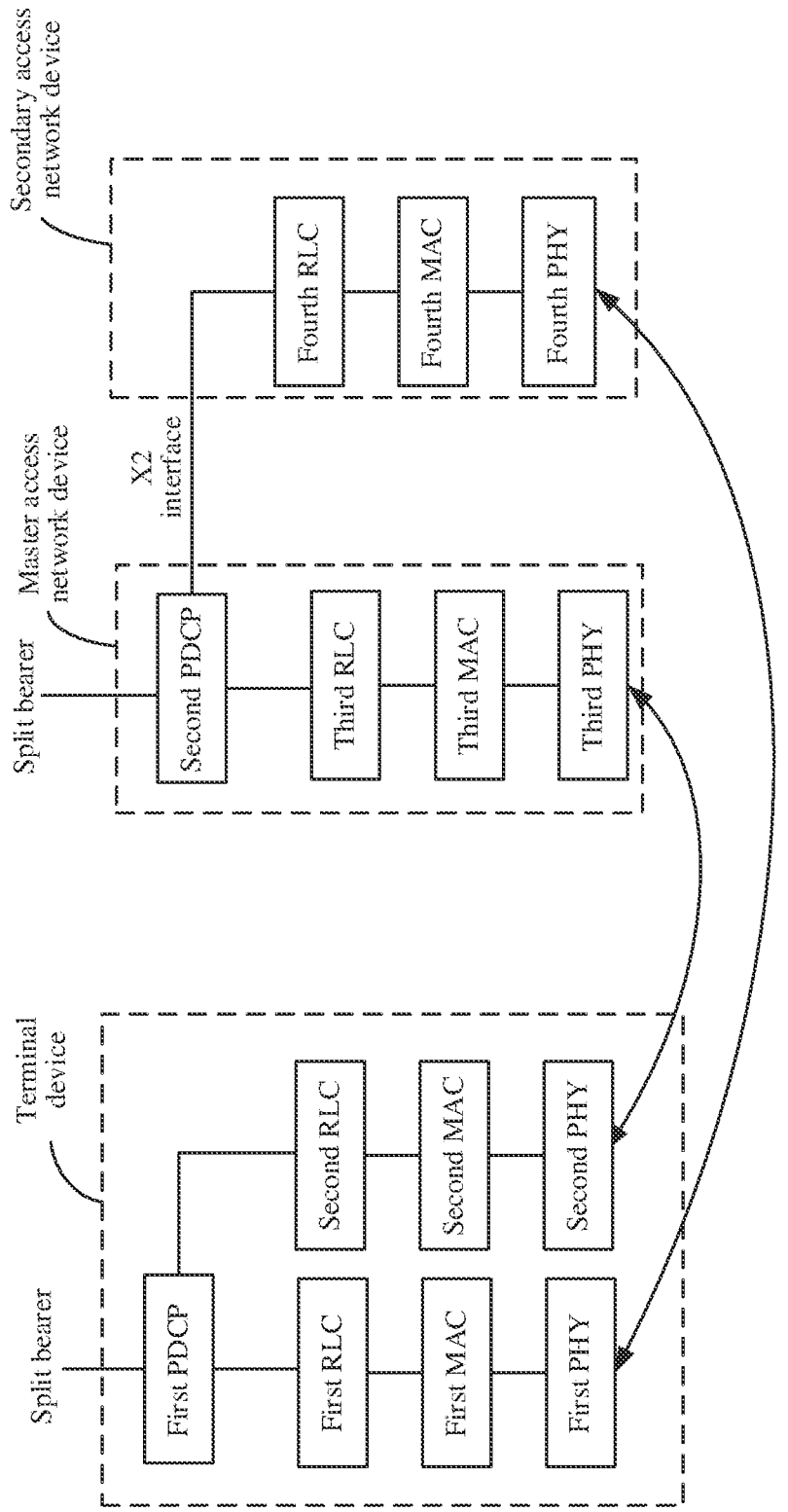
FIG. 3 and FIG. 4 are schematic diagrams of communications systems according to embodiments of this application.
Figure 4:
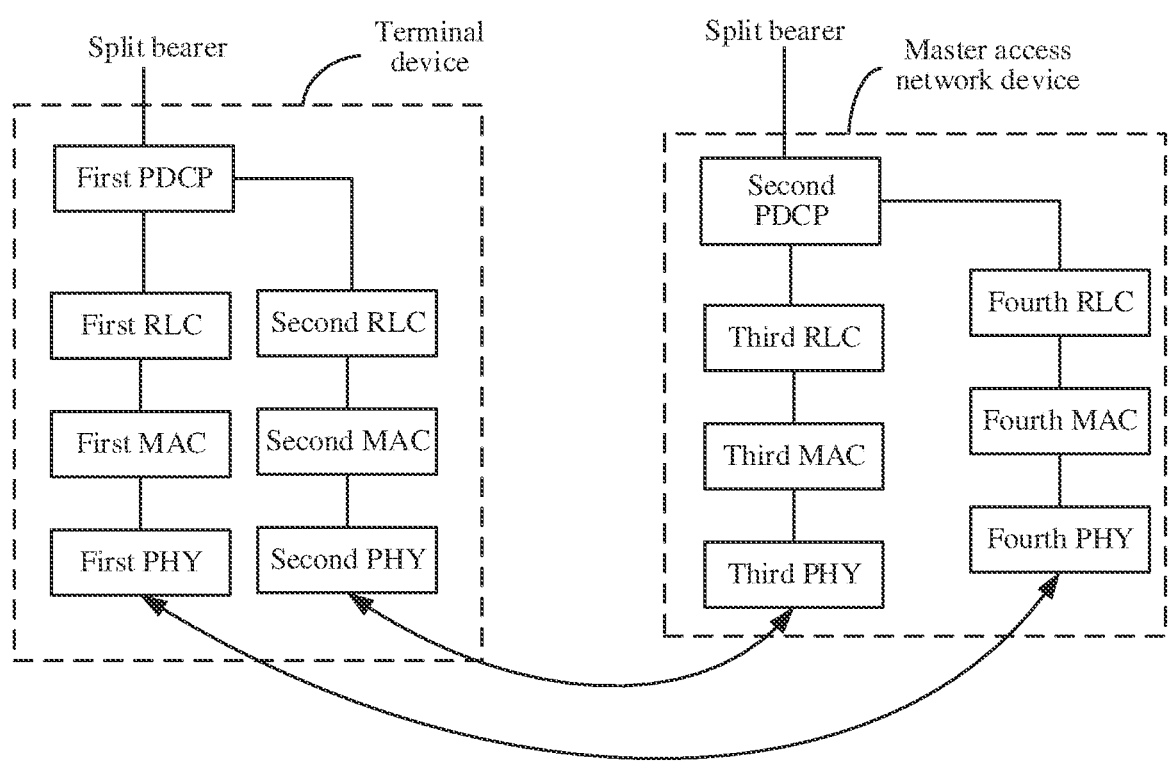

FIG. 3 and FIG. 4 are schematic diagrams of two communications systems according to embodiments of this application. The communications system shown in FIG. 3 includes a master access network device, a secondary access network device, and a terminal device. The communications system shown in FIG. 4 includes a master access network device and a terminal device.

The master access network device and the secondary access network device are access devices that enable the terminal device to access the mobile communications system in a wireless manner, and may be NodeBs, evolved NodeBs eNodeBs, base stations in a 5G mobile communications system, base stations in a future mobile communications system, access points in a WiFi system, or the like. Specific technologies used by and specific device types of the access network devices are not limited in the embodiments of this application.

The terminal device may be an access terminal, user equipment (UE), a subscriber unit, a subscriber station, a mobile station, a mobile console, a remote station, a remote terminal, a mobile terminal, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in an Internet of Things, a virtual reality device, a terminal device in a future 5G network, a terminal device in a future evolved public land mobile network (PLMN), or the like.

The master access network device, the secondary access network device, and the terminal device may be deployed on land, for example, in an indoor or outdoor environment, and in a handheld or in-vehicle form; may be deployed on the water; or may be deployed on an overhead aircraft, balloon, or satellite. The embodiments of this application do not limit application scenarios of the master access network device, the secondary access network device, and the terminal device.

In the communications system shown in FIG. 3, a first RLC entity and a second RLC entity of a split bearer are located in the terminal device, a third RLC entity of the split bearer is located in the master access network device, and a fourth RLC entity of the split bearer is located in the secondary access network device. In the communications system shown in FIG. 4, a first RLC entity and a second RLC entity of a split bearer are located in the terminal device, and a third RLC entity and a fourth RLC entity of the split bearer are located in the master access network device.

In the communications systems shown in FIG. 3 and FIG. 4, for uplink transmission, if the split bearer is based on duplicate transmission, after generating a PDCP PDU, a first PDCP entity of the split bearer in the terminal device delivers the PDCP PDU to the first RLC entity and the second RLC entity of the split bearer simultaneously. For example, the PDCP PDU received by the first RLC entity is referred to as a first RLC SDU, and the PDCP PDU received by the second RLC entity is referred to as a second RLC SDU (that is, the first RLC SDU is the same as the second RLC SDU). The first RLC entity generates one or more first RLC PDUs based on the first RLC SDU, and generates a serial number of the first RLC SDU. The second RLC entity generates one or more second RLC PDUs based on the second RLC SDU, and generates a serial number of the second RLC SDU. The serial number of the first RLC SDU may be the same as or different from the serial number of the second RLC SDU. The first RLC entity transmits the first RLC PDU and the serial number of the first RLC SDU to the fourth RLC entity. After receiving the first RLC PDU, the fourth RLC entity obtains the first RLC SDU (that is, the PDCP PDU) based on the first RLC PDU, and transmits the first RLC SDU to a second PDCP entity. The second RLC entity transmits the second RLC PDU and the serial number of the second RLC SDU to the third RLC entity. After receiving the second RLC PDU, the third RLC entity obtains the second RLC SDU (that is, the PDCP PDU) based on the second RLC PDU, and transmits the second RLC SDU to the second PDCP entity. To be specific, the first PDCP entity of the terminal device transmits the same PDCP PDU to the second PDCP entity through two paths.

In the communications systems shown in FIG. 3 and FIG. 4, for downlink transmission, if the split bearer is based on duplicate transmission, after generating a PDCP PDU, the second PDCP entity of the split bearer in the master access network device delivers the PDCP PDU to the third RLC entity and the fourth RLC entity of the split bearer simultaneously. For example, the PDCP PDU received by the third RLC entity is referred to as a third RLC SDU, and the PDCP PDU received by the fourth RLC entity is referred to as a fourth RLC SDU (that is, the third RLC SDU is the same as the fourth RLC SDU). In the communications system shown in FIG. 3, the second PDCP entity may transmit the PDCP PDU to the fourth RLC entity through an interface (that is, an interface between two access network devices, such as an X2 interface or an Xn interface). The third RLC entity generates one or more third RLC PDUs based on the third RLC SDU, and generates a serial number of the third RLC SDU. The fourth RLC entity generates one or more fourth RLC PDUs based on the fourth RLC SDU, and generates a serial number of the fourth RLC SDU. The serial number of the third RLC SDU may be the same as or different from the serial number of the fourth RLC SDU. The third RLC entity transmits the third RLC PDU and the serial number of the third RLC SDU to the second RLC entity. After receiving the third RLC PDU, the second RLC entity obtains the third RLC SDU (that is, the PDCP PDU) based on the third RLC PDU, and transmits the third RLC SDU to the first PDCP entity. The fourth RLC entity transmits the fourth RLC PDU and the serial number of the fourth RLC SDU to the first RLC entity. After receiving the fourth RLC PDU, the first RLC entity obtains the fourth RLC SDU (that is, the PDCP PDU) based on the fourth RLC PDU, and transmits the fourth RLC SDU to the first PDCP entity. To be specific, the second PDCP entity of the master access network device transmits the same PDCP PDU to the first PDCP entity through two paths.

In existing actual application, a mode of the RLC entity of the split bearer is an acknowledged mode (AM). When packet loss is detected, the RLC entity in the AM can request an RLC entity at a transmit end to retransmit a packet. This is an automatic repeat request (ARQ) mechanism. For the uplink transmission, for example, if the third RLC entity does not successfully receive the second RLC PDU, the third RLC entity transmits a status report including the serial number of the second RLC SDU to the second RLC entity. After receiving the serial number of the second RLC SDU in the status report, the second RLC entity continues to retransmit the unsuccessfully transmitted second RLC PDU. Similarly, for the downlink transmission, for example, if the second RLC entity does not successfully receive the third RLC PDU, the second RLC entity transmits a status report including the serial number of the third RLC SDU to the third RLC entity. After receiving the serial number of the third RLC SDU in the status report, the third RLC entity continues to retransmit the unsuccessfully transmitted third RLC PDU. However, the same PDCP PDU is transmitted on each path, but it is sufficient to successfully transmit the PDCP PDU on only one path. Consequently, waste of air interface overheads is caused. A priority of retransmitting a PDU at an RLC layer is always higher than that of initially transmitting the PDU. Consequently, subsequent transmission of a new PDU is blocked and a transmission latency is increased.

To this end, embodiments of this application provide a duplicate transmission method and a related device, and a duplicate transmission configuration method and a related device, to resolve problems of waste of air interface overheads and a long transmission latency.

The following further describes the duplicate transmission method and the related device, and the duplicate transmission configuration method and the related device according to this application.

Figure 5:
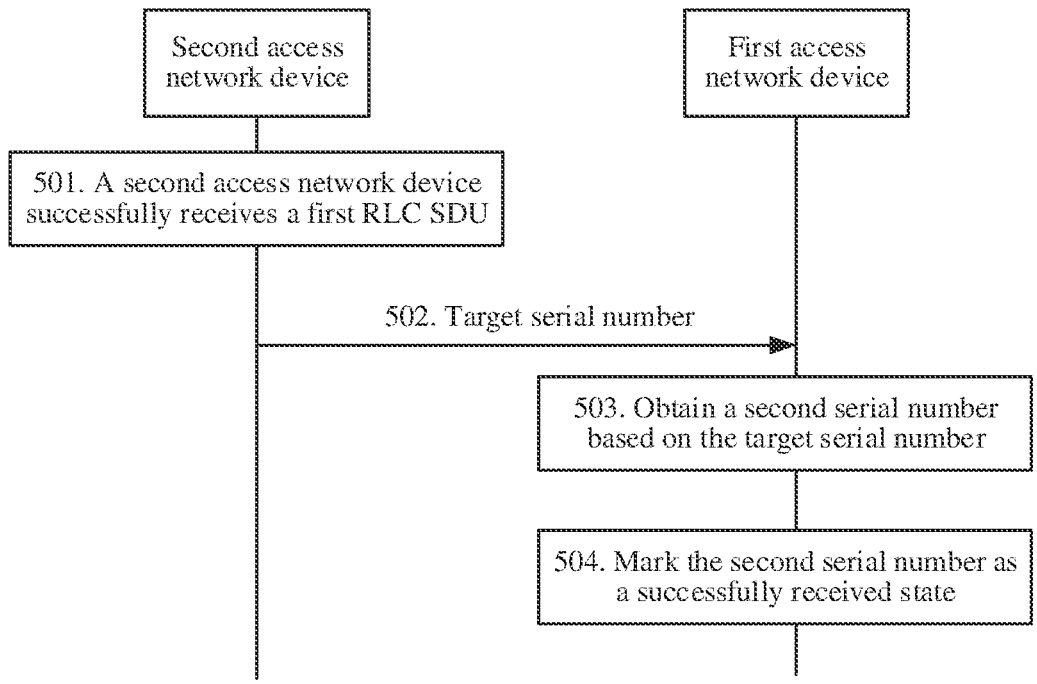
FIG. 5 is a schematic flowchart of a duplicate transmission method according to an embodiment of this application.

FIG. 5 shows a duplicate transmission method according to an embodiment of this application. For a communications system applicable to the method, refer to the communications system shown in FIG. 3. As shown in FIG. 5, the duplicate transmission method includes the following steps 501 to 504.

501. A second access network device successfully receives a first RLC SDU.

In this embodiment of this application, a first access network device, the second access network device, and a terminal device each include an RLC entity of a split bearer. A transmission mode of the split bearer is duplicate transmission, and all RLC entities of the split bearer are in an acknowledged mode (AM).

As shown in FIG. 3, the master access network device includes a third RLC entity of the split bearer, the secondary access network device includes a fourth RLC entity of the split bearer, and the terminal device includes a first RLC entity and a second RLC entity of the split bearer. The second access network device may be the master access network device or the secondary access network device. If the second access network device is the master access network device, the first access network device is the secondary access network device. If the second access network device is the secondary access network device, the first access network device is the master access network device.

The first RLC SDU is transmitted by the terminal device to the second access network device.

In this embodiment of this application, the second access network device may further receive a serial number (SN number) of the first RLC SDU, that is, a first serial number.

502. The second access network device transmits a target serial number to the first access network device.

In this embodiment of this application, after successfully receiving the first RLC SDU and the serial number of the first RLC SDU, the second access network device transmits the target serial number to the first access network device. The target serial number is obtained based on the first serial number.

Optionally, the second access network device may transmit the target serial number to the first access network device through a communications interface (such as an X2 interface or an Xn interface).

503. The first access network device obtains a second serial number based on the target serial number.

504. The first access network device marks the second serial number as a successfully received state.

In this embodiment of this application, after receiving the target serial number transmitted by the second access network device, the first access network device obtains the second serial number based on the target serial number. After obtaining the second serial number, the first access network device marks the second serial number as the successfully received state.

The second serial number is a serial number of a second RLC SDU, and the second RLC SDU is the same as the first RLC SDU.

For example, as shown in FIG. 3, the first PDCP entity transmits the same PDCP PDU to the first RLC entity and the second RLC entity. The PDCP PDU received by the first RLC entity is referred to as a first RLC SDU, and the PDCP PDU received by the second RLC entity is referred to as a second RLC SDU, so that the first RLC SDU is the same as the second RLC SDU. The first RLC SDU may be transmitted by the first RLC entity of the terminal device to the secondary access network device, and the second RLC SDU may be transmitted by the second RLC entity of the terminal device to the master access network device. After successfully receiving the first RLC SDU, the secondary access network device obtains the target serial number based on the serial number of the first RLC SDU, and transmits the target serial number to the master access network device. The master access network device obtains the serial number of the second RLC SDU based on the target serial number, and marks the serial number of the second RLC SDU as a successfully received state. In this way, the master access network device may transmit a status report not including the serial number of the second RLC SDU to the terminal device. Further, when the master access network device does not successfully receive the second RLC SDU, the terminal device does not need to retransmit the second RLC PDU to the master access network device.

Similarly, if the first RLC SDU is transmitted by the first RLC entity of the terminal device to the secondary access network device, and the second RLC SDU is transmitted by the second RLC entity of the terminal device to the master access network device, after successfully receiving the first RLC SDU, the master access network device obtains the target serial number based on the serial number of the first RLC SDU, and transmits the target serial number to the secondary access network device. The secondary access network device obtains the serial number of the second RLC SDU based on the target serial number, and marks the serial number of the second RLC SDU as a successfully received state. In this way, the secondary access network device may transmit a status report not including the serial number of the second RLC SDU to the terminal device. Further, when the secondary access network device does not successfully receive the second RLC SDU, the terminal device does not need to retransmit the second RLC PDU corresponding to the second RLC SDU to the secondary access network device.

It can be learned that, by implementing the method described in FIG. 5, waste of air interface overheads is reduced, and a transmission latency is reduced.

Optionally, the target serial number is the first serial number, or the target serial number is a PDCP serial number corresponding to the first serial number.

Optionally, a specific implementation of obtaining the second serial number by the first access network device based on the target serial number may be: determining, by the first access network device, that the target serial number is the second serial number.

For example, if the target serial number is the first serial number, the first access network device may directly determine that the first serial number is the second serial number.

For another example, if the target serial number is the PDCP serial number corresponding to the first serial number, the first access network device may directly determine that the PDCP serial number corresponding to the first serial number is the second serial number.

Optionally, the target serial number is the PDCP serial number, and a specific implementation of obtaining the second serial number by the first access network device based on the target serial number may be: determining, by the first access network device based on a prestored correspondence between the PDCP serial number and a serial number of an RLC SDU, that a serial number corresponding to the target serial number is the second serial number.

For example, the second access network device is the master access network device and the first access network device is the secondary access network device. As shown in FIG. 3, the terminal device transmits the first RLC SDU and the first serial number (that is, the serial number of the first RLC SDU) to the third RLC entity of the master access network device by using the second RLC entity; and transmits the second RLC SDU (that is the same as the first RLC SDU) and the second serial number (that is, the serial number of the second RLC SDU) to the fourth RLC entity of the secondary access network device by using the first RLC entity. After receiving the first RLC SDU, the third RLC entity of the master access network device may directly transmit the target serial number to the fourth RLC entity, where the target serial number is obtained based on the first serial number (and the target serial number is the first serial number). After receiving the target serial number, the secondary access network device determines that the target serial number is the second serial number.

Alternatively, the third RLC entity transmits the first serial number to the second PDCP entity, and the second PDCP entity transmits the target serial number to the fourth RLC entity through a communications interface (such as an X2 interface), where the target serial number is obtained based on the first serial number (and the target serial number is the first serial number). After receiving the target serial number, the fourth RLC entity of the secondary access network device determines that the target serial number is the second serial number.

Alternatively, after successfully receiving the first RLC SDU, the third RLC entity of the master access network device transmits the first serial number to the second PDCP entity. After receiving the first serial number, the second PDCP entity determines, based on a prestored correspondence between a PDCP serial number and a serial number that is of an SDU and that is generated by the second RLC entity, the PDCP serial number corresponding to the first serial number. Through a communications interface (such as an X2 interface), the second PDCP entity transmits the target serial number to the fourth RLC entity (the target serial number is a PDCP serial number corresponding to the first serial number). After receiving the first serial number, the fourth RLC entity of the secondary access network device may determine that the PDCP serial number corresponding to the first serial number is the second serial number; or the first access network device determines, based on a prestored correspondence between a PDCP serial number and a serial number that is of an SDU and that is generated by the first RLC entity, that a serial number corresponding to the target serial number is the second serial number.

After determining the second serial number, the secondary access network device marks the second serial number as a successfully received state, so that the fourth RLC entity can transmit a status report not including the second serial number to the first RLC entity. In this way, even if the fourth RLC entity of the secondary access network device does not successfully receive the second RLC SDU, the first RLC entity does not continue to retransmit, to the fourth RLC entity, the second RLC PDU generated after encapsulation of the second RLC SDU.

For another example, the second access network device is the secondary access network device and the first access network device is the master access network device. As shown in FIG. 3, the terminal device transmits the first RLC SDU and the first serial number (that is, the serial number of the first RLC SDU) to the fourth RLC entity of the secondary access network device by using the first RLC entity; and transmits the second RLC SDU (that is the same as the first RLC SDU) and the second serial number (that is, the serial number of the second RLC SDU) to the third RLC entity of the master access network device by using the second RLC entity. After successfully receiving the first RLC SDU, the fourth RLC entity of the secondary access network device may directly transmit the target serial number to the third RLC entity, where the target serial number is obtained based on the first serial number (and the target serial number is the first serial number). After receiving the target serial number, the third RLC entity of the master access network device determines that the target serial number is the second serial number.

Alternatively, the fourth RLC entity may transmit the target serial number to the second PDCP entity through a communications interface (such as an X2 interface), where the target serial number is obtained based on the first serial number (and the target serial number is the first serial number), and then the second PDCP entity transmits the target serial number to the third RLC entity. After receiving the target serial number, the third RLC entity of the master access network device determines that the target serial number is the second serial number.

Alternatively, the fourth RLC entity may transmit the target serial number to the second PDCP entity through a communications interface (such as an X2 interface), where the target serial number is obtained based on the first serial number (and the target serial number is the first serial number); and the second PDCP entity determines, based on a prestored correspondence between a serial number that is of an SDU and that is generated by the first RLC entity and a PDCP serial number, a first PDCP serial number corresponding to the first serial number, and transmits the first PDCP serial number to the third RLC entity. The third RLC entity determines, based on a prestored correspondence between a serial number that is of an SDU and that is generated by the second RLC entity and a PDCP serial number, that a serial number of an SDU corresponding to the first PDCP serial number is the second serial number.

The third RLC entity of the master access network device marks the second serial number as a successfully received state, so that the third RLC entity can transmit a status report not including the second serial number to the second RLC entity. In this way, even if the third RLC entity of the master access network device does not successfully receive the second RLC SDU, the second RLC entity does not continue to retransmit the second RLC PDU corresponding to the second RLC SDU to the third RLC entity.

Optionally, after marking the second serial number as a successfully received state, the first access network device may further transmit a status report not including the second serial number to the terminal device. Specifically, after marking the second serial number as the successfully received state, the RLC entity of the split bearer in the first access network device transmits the status report not including the second serial number to the RLC entity of the split bearer in the terminal device.

For example, if the first access network device is the master access network device, after marking the second serial number as a successfully received state, the third RLC entity of the master access network device transmits a status report not including the second serial number to the second RLC entity of the terminal device. In this way, even if the third RLC entity of the master access network device does not successfully receive the second RLC SDU transmitted by the second RLC entity, the second RLC entity does not continue to retransmit the second RLC PDU corresponding to the second RLC SDU to the third RLC entity, thereby helping reduce waste of air interface overheads and reduce a transmission latency.

For another example, if the first access network device is the secondary access network device, after marking the second serial number as a successfully received state, the fourth RLC entity of the secondary access network device transmits a status report not including the second serial number to the first RLC entity of the terminal device. In this way, even if the fourth RLC entity of the secondary access network device does not successfully receive the second RLC SDU transmitted by the first RLC entity, the first RLC entity does not continue to retransmit the second RLC PDU corresponding to the second RLC SDU to the fourth RLC entity, thereby helping reduce waste of air interface overheads and reduce a transmission latency.

Figure 6:
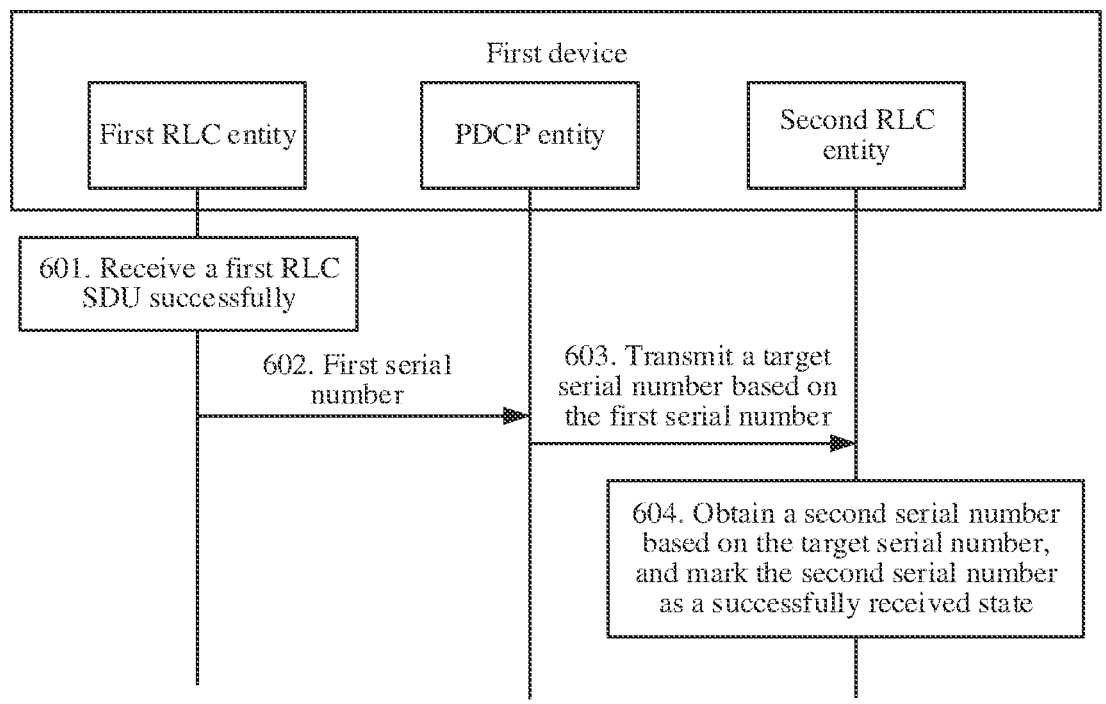
FIG. 6 is a schematic flowchart of a duplicate transmission method according to an embodiment of this application.

FIG. 6 shows another duplicate transmission method according to an embodiment of this application. For a communications system applicable to the method, refer to the communications system shown in FIG. 3 or FIG. 4. As shown in FIG. 6, the duplicate transmission method includes the following steps 601 to 604.

601. A first RLC entity of a first device successfully receives a first RLC SDU.

In this embodiment of this application, the first RLC entity of the first device may also receive a first serial number. The first serial number is a serial number (that is, an SN number) of the first RLC SDU.

602. The first RLC entity of the first device transmits the first serial number to a PDCP entity of the first device.

A split bearer corresponding to the PDCP entity includes a first RLC entity and a second RLC entity, a transmission mode of the split bearer is duplicate transmission, and the RLC entities of the split bearer are in an acknowledged mode AM. The first RLC entity is any one of the RLC entities in the split bearer of the first device, and the second RLC entity is an RLC entity other than the first RLC entity in the split bearer of the first device.

Optionally, the first device may be a terminal device. For example, as shown in FIG. 3 and FIG. 4, after generating the first RLC SDU and the first serial number (that is, the serial number of the first RLC SDU), a fourth RLC entity transmits the first RLC SDU and the first serial number to the first RLC entity. After generating a second RLC SDU (that is the same as the first RLC SDU) and a second serial number (that is, a serial number of the second RLC SDU), a third RLC entity transmits the second RLC SDU and the second serial number to the second RLC entity. After successfully receiving the first RLC SDU and the first serial number, the first RLC entity transmits the first serial number to the first PDCP entity. Certainly, alternatively, the third RLC entity generates the first RLC SDU and the first serial number, and then transmits the first RLC SDU and the first serial number to the first RLC entity, and the fourth RLC entity generates the second RLC SDU and the second serial number, and then transmits the second RLC SDU and the second serial number to the second RLC entity. This is not limited in this embodiment of this application.

Figure 7:
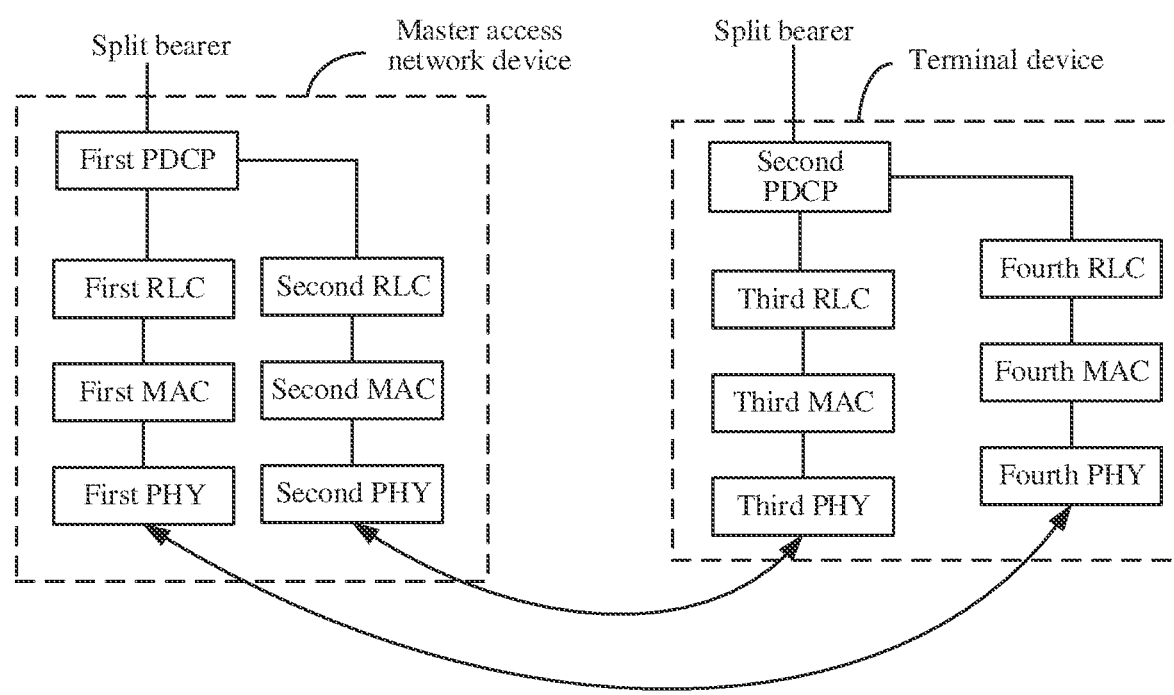
FIG. 7 is a schematic diagram of another communications system according to an embodiment of this application.

Optionally, the first device may be a master access network device. For example, as shown in FIG. 7, the master access network device includes a first RLC entity and a second RLC entity of a split bearer, and the terminal device includes a third RLC entity and a fourth RLC entity of the split bearer. After generating the first RLC SDU and the first serial number, the fourth RLC entity transmits the first RLC SDU and the first serial number to the first RLC entity. After generating the second RLC SDU and the second serial number, the third RLC entity transmits the second RLC SDU and the second serial number to the second RLC entity, where content of the second RLC SDU is the same as that of the first RLC SDU. After successfully receiving the first RLC SDU and the first serial number, the first RLC entity transmits the first serial number to the first PDCP entity.

603. The PDCP entity transmits a target serial number to the second RLC entity of the first device based on the first serial number.

In this embodiment of this application, after receiving the first serial number, the PDCP entity of the first device transmits the target serial number to the second RLC entity of the first device based on the first serial number.

604. The second RLC entity determines the second serial number based on the target serial number, and marks the second serial number as a successfully received state.

The second serial number is the serial number of the second RLC SDU, and the second RLC SDU is the same as the first RLC SDU.

It can be learned that, by implementing the method described in FIG. 6, after successfully receiving the first RLC SDU, the first RLC entity of the first device notifies the first serial number of the first RLC SDU to the PDCP entity of the first device. The PDCP entity of the first device transmits the target serial number to the second RLC entity of the first device based on the first serial number. The second RLC entity may determine the second serial number based on the target serial number, and mark the second serial number as the successfully received state. In this way, even if the second RLC entity does not successfully receive the second RLC SDU, a status report not including the second serial number may be transmitted to the RLC entity that transmits the second RLC SDU, so that the RLC entity that transmits the second RLC SDU does not retransmit the second RLC PDU corresponding to the second RLC SDU to the second RLC entity. Therefore, by implementing the method described in FIG. 6, waste of air interface overheads is reduced, and a transmission latency is reduced.

Optionally, the target serial number is the first serial number, or the target serial number is a PDCP serial number corresponding to the first serial number.

For example, the target serial number is the PDCP serial number corresponding to the first serial number. After receiving the first serial number transmitted by the first RLC entity, the first PDCP entity may determine, based on a prestored correspondence between a PDCP serial number and an RLC serial number that is of a PDU and that is received by the first RLC entity, the PDCP serial number corresponding to the first serial number, and then transmit the PDCP serial number corresponding to the first serial number to the second RLC entity.

Optionally, the target serial number is used for the second RLC entity to determine that the target serial number is the second serial number of the second PDU. To be specific, after receiving the target serial number, the second RLC entity determines that the target serial number is the second serial number of the second PDU.

For example, if the target serial number is the first serial number, the first access network device may directly determine that the first serial number is the second serial number. For another example, if the target serial number is the PDCP serial number corresponding to the first serial number, the first access network device may directly determine that the PDCP serial number corresponding to the first serial number is the second serial number.

Optionally, the target serial number is the PDCP serial number, and the PDCP serial number is used for the second RLC entity to determine, based on a prestored correspondence between a PDCP serial number and an RLC serial number, that a serial number corresponding to the target serial number is the second serial number. To be specific, after receiving the target serial number, the second RLC entity determines, based on a prestored correspondence between a PDCP serial number and a serial number that is of an SDU and that is received by the second RLC entity, that a serial number corresponding to the target serial number is the second serial number.

Optionally, an RLC entity of the split bearer is further located in a second device, and the second RLC entity is configured to transmit, after marking the second serial number as a successfully received state, a status report not including the second serial number to the second device. Optionally, the second device may be the master access network device or the secondary access network device shown in FIG. 3, and correspondingly, the first device is the terminal device shown in FIG. 3. Optionally, the second device may be the master access network device shown in FIG. 4, and correspondingly, the first device is the terminal device shown in FIG. 4. Optionally, the second device may be the terminal device shown in FIG. 7, and correspondingly, the first device is the master access network device shown in FIG. 4. In this way, even if the second RLC entity of the first device does not successfully receive the second RLC SDU, the second device does not continue to retransmit the second RLC PDU corresponding to the second RLC SDU to the second RLC entity, thereby helping reduce waste of air interface overheads and reduce a transmission latency.

Figure 8:
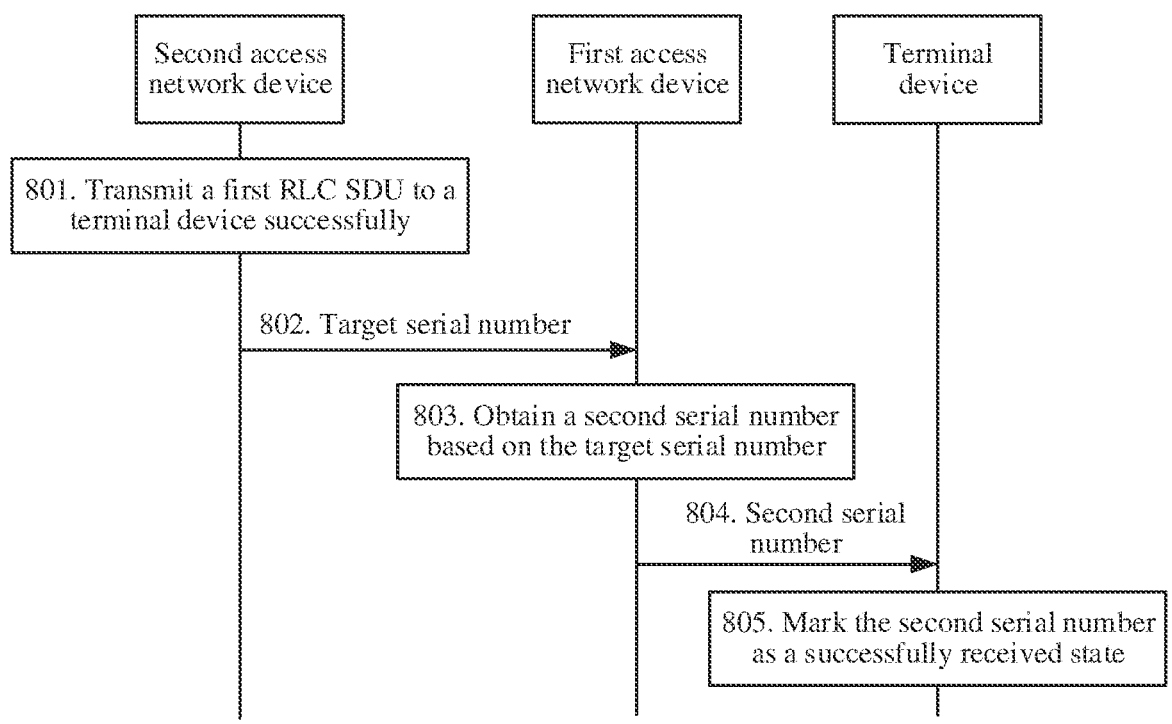
FIG. 8 and FIG. 9 are schematic flowcharts of duplicate transmission methods according to embodiments of this application.

FIG. 8 shows another duplicate transmission method according to an embodiment of this application. For a communications system applicable to the method, refer to the communications system shown in FIG. 3. As shown in FIG. 8, the duplicate transmission method includes the following steps 801 to 805.

801. A second access network device successfully transmits a first RLC SDU to a terminal device.

In this embodiment of this application, a first access network device, the second access network device, and the terminal device each include an RLC entity of a split bearer. A transmission mode of the split bearer is duplicate transmission, and RLC entities of the split bearer are in an acknowledged mode AM.

As shown in FIG. 3, the master access network device includes a third RLC entity of the split bearer, the secondary access network device includes a fourth RLC entity of the split bearer, and the terminal device includes a first RLC entity and a second RLC entity of the split bearer. The second access network device may be a master access network device or a secondary access network device. If the second access network device is the master access network device, the first access network device is the secondary access network device. If the second access network device is the secondary access network device, the first access network device is the master access network device.

Optionally, the second access network device may determine, based on a status report fed back by the terminal device, whether the first RLC SDU is successfully transmitted.

802. The second access network device transmits a target serial number to the first access network device.

In this embodiment of this application, the target serial number is obtained based on a first serial number. The first serial number is a serial number of the first RLC SDU (that is, an SN number of the first RLC SDU). Optionally, the second access network device may transmit the target serial number to the first access network device through a communications interface (such as an X2 interface).

803. The first access network device obtains a second serial number based on the target serial number.

In this embodiment of this application, after receiving the target serial number transmitted by the second access network device, the first access network device obtains the second serial number based on the target serial number. The second serial number is a serial number of a second RLC SDU, and the first RLC SDU is the same as the second RLC SDU.

804. The first access network device transmits the second serial number to the terminal device.

The second serial number is used for the terminal device to mark the second serial number as a successfully received state. Optionally, after receiving the status report transmitted by the terminal device, the first access network device may transmit the second serial number to the terminal device. Alternatively, after determining the second serial number, the first access network device may transmit the second serial number to the terminal device immediately.

805. The terminal device marks the second serial number as the successfully received state.

In this embodiment of this application, after receiving the second serial number, the terminal device marks the second serial number as the successfully received state.

For example, the second access network device is the master access network device and the first access network device is the secondary access network device. As shown in FIG. 3, the third RLC entity transmits the first RLC SDU to the second RLC entity of the terminal device, and the fourth RLC entity transmits the second RLC SDU to the first RLC entity of the terminal device. The first RLC SDU is the same as the second RLC SDU. After successfully transmitting the first RLC SDU to the second RLC entity of the terminal device, the master access network device transmits the target serial number to the secondary access network device, where the target serial number is obtained based on the first serial number (that is, the serial number of the first RLC SDU). After receiving the target serial number, the secondary access network device obtains the second serial number (that is, the serial number of the second RLC SDU) based on the target serial number, and transmits the second serial number to the first RLC entity of the terminal device. After receiving the second serial number, the first RLC entity of the terminal device marks the second serial number as a successfully received state. In this way, even if the first RLC entity of the terminal device does not successfully receive the second PDU transmitted by the secondary access network device, the terminal device may transmit a status report not including the second serial number to the secondary access network device, so that the secondary access network device does not need to retransmit the second RLC PDU corresponding to the second RLC SDU to the first RLC entity of the terminal device. This is similar to an example in which the second access network device is the secondary access network device and the first access network device is the master access network device, and no repeated description is given herein again. Therefore, it can be learned that, by implementing the method described in FIG. 8, waste of air interface overheads is reduced, and a transmission latency is reduced.

Optionally, the target serial number is the first serial number, or the target serial number is a PDCP serial number corresponding to the first serial number.

Optionally, a specific implementation of obtaining the second serial number by the first access network device based on the target serial number may be: determining, by the first access network device, that the target serial number is the second serial number.

For example, if the target serial number is the first serial number, the first access network device may directly determine that the first serial number is the second serial number. For another example, if the target serial number is the PDCP serial number corresponding to the first serial number, the first access network device may directly determine that the PDCP serial number corresponding to the first serial number is the second serial number.

Optionally, the target serial number is the PDCP serial number, and a specific implementation of obtaining the second serial number by the first access network device based on the target serial number may be: determining, by the first access network device based on a prestored correspondence between the PDCP serial number and a serial number of an RLC SDU, that a serial number corresponding to the target serial number is the second serial number.

For example, the second access network device is the master access network device and the first access network device is the secondary access network device. As shown in FIG. 3, after successfully transmitting the first RLC SDU and the first serial number to the second RLC entity of the terminal device, the third RLC entity of the master access network device may directly transmit the target serial number (the target serial number is the first serial number) to the fourth RLC entity, where the target serial number is obtained based on the first serial number. After receiving the first serial number, the fourth RLC entity of the secondary access network device determines that the first serial number is the second serial number.

Alternatively, after successfully transmitting the first RLC SDU and the first serial number to the second RLC entity of the terminal device, the third RLC entity of the master access network device transmits the first serial number to a second PDCP entity, and the second PDCP entity transmits the target serial number (the target serial number is the first serial number) to the fourth RLC entity through a communications interface (such as an X2 interface), where the target serial number is obtained based on the first serial number. After receiving the first serial number, the fourth RLC entity of the secondary access network device determines that the first serial number is the second serial number.

Alternatively, after successfully transmitting the first RLC SDU and the first serial number to the second RLC entity of the terminal device, the third RLC entity of the master access network device transmits the first serial number to a second PDCP entity. After receiving the first serial number, the second PDCP entity determines, based on a prestored correspondence between the PDCP serial number and a serial number that is of an SDU and that is generated by the third RLC entity, the PDCP serial number corresponding to the first serial number. The second PDCP entity transmits the target serial number (the target serial number is a PDCP serial number corresponding to the first serial number) to the fourth RLC entity through a communications interface (such as an X2 interface). After receiving the first serial number, the fourth RLC entity of the secondary access network device may determine that the PDCP serial number corresponding to the first serial number is the second serial number; or the secondary access network device determines, based on a prestored correspondence between the PDCP serial number and a serial number that is of an SDU and that is generated by the fourth RLC entity, that a serial number corresponding to the target serial number is the second serial number.

After determining the second serial number, the secondary access network device transmits the second serial number to the first RLC entity of the terminal device. After receiving the second serial number, the first RLC entity of the terminal device marks the second serial number as a successfully received state, so that the first RLC entity can transmit a status report not including the second serial number to the fourth RLC entity. In this way, even if the first RLC entity of the terminal device does not successfully receive the second RLC SDU transmitted by the fourth RLC entity, the fourth RLC entity does not continue to retransmit the second RLC PDU to the first RLC entity, where the second RLC PDU is generated after encapsulation of the second RLC SDU.

For another example, the second access network device is the secondary access network device and the first access network device is the master access network device. As shown in FIG. 3, after successfully transmitting the first RLC SDU and the first serial number to the first RLC entity of the terminal device, the fourth RLC entity of the secondary access network device may directly transmit the target serial number (the target serial number is the first serial number) to the third RLC entity, where the target serial number is obtained based on the first serial number. After receiving the first serial number, the third RLC entity of the master access network device determines that the first serial number is the second serial number.

Alternatively, the fourth RLC entity may transmit the target serial number (the target serial number is the first serial number) to the second PDCP entity through a communications interface (such as an X2 interface), where the target serial number is obtained based on the first serial number. The second PDCP entity may transmit the target serial number to the third RLC entity. The third RLC entity determines that the target serial number is the second serial number.

Alternatively, the fourth RLC entity may transmit the target serial number (the target serial number is the first serial number) to the second PDCP entity through a communications interface (such as an X2 interface), where the target serial number is obtained based on the first serial number. After receiving the first serial number, the second PDCP entity determines, based on a prestored correspondence between the PDCP serial number and a serial number that is of an SDU and that is generated by the fourth RLC entity, a first PDCP serial number corresponding to the first serial number. The second PDCP entity transmits the first PDCP serial number to the third RLC entity. After receiving the first PDCP serial number, the third RLC entity may determine, based on a prestored correspondence between a serial number that is of an SDU and that is generated by the third RLC entity and the PDCP serial number, that an RLC serial number corresponding to the first PDCP serial number is the second serial number.

After obtaining the second serial number, the third RLC entity of the master access network device transmits the second serial number to the second RLC entity. The second RLC entity marks the second serial number as a successfully received state, so that the second RLC entity can transmit a status report not including the second serial number to the third RLC entity. In this way, even if the third RLC entity of the master access network device does not successfully transmit the second RLC SDU to the second RLC entity, the third RLC entity does not continue to retransmit the second RLC PDU corresponding to the second RLC SDU to the second RLC entity.

Figure 9:
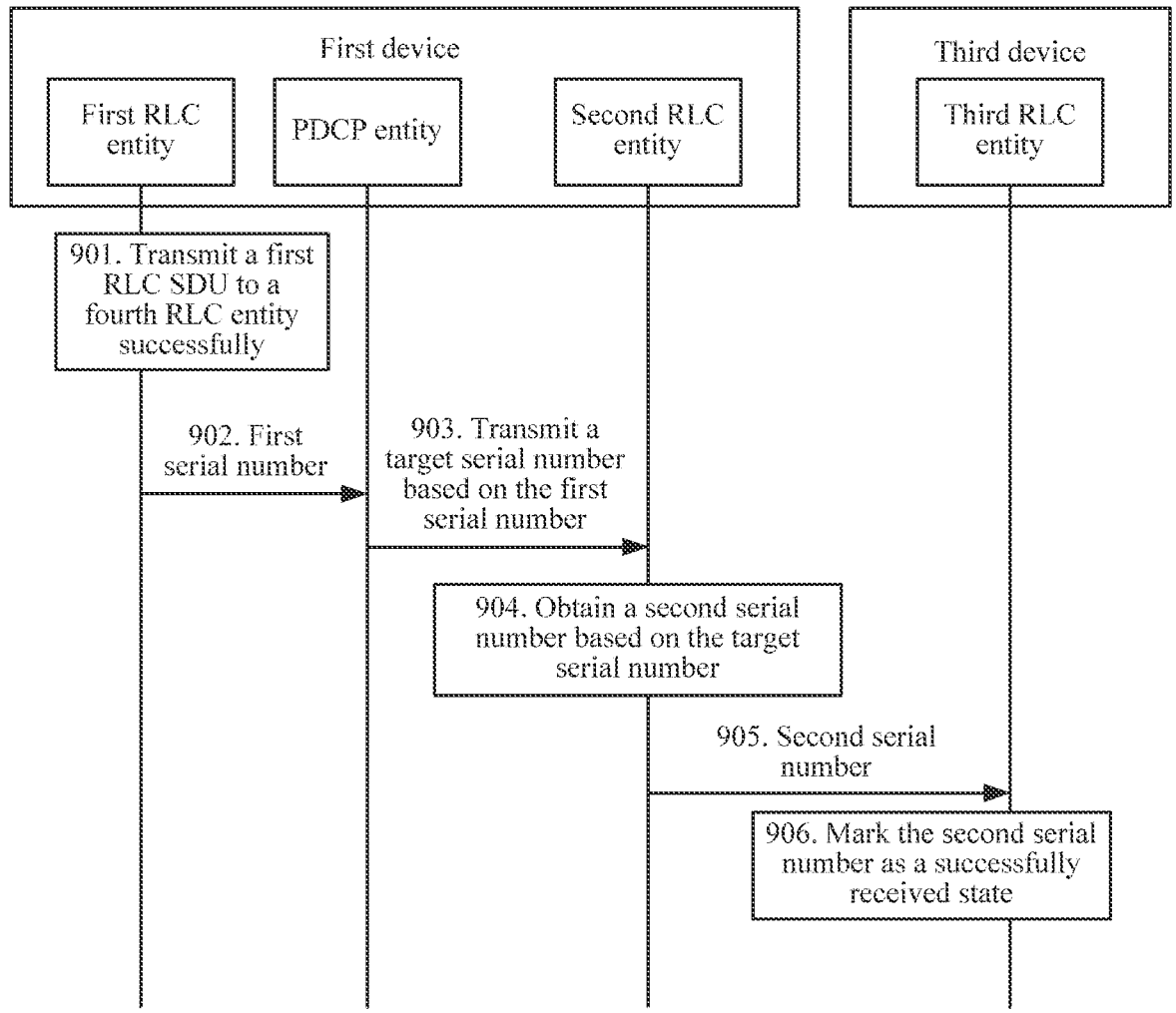

FIG. 9 shows another duplicate transmission method according to an embodiment of this application. For a communications system applicable to the method, refer to the communications system shown in FIG. 3, FIG. 4, or FIG. 7. As shown in FIG. 9, the duplicate transmission method includes the following steps 901 to 906.

901. A first RLC entity of a first device successfully transmits a first RLC SDU to a fourth RLC entity.

902. The first RLC entity of the first device transmits a first serial number to a PDCP entity of the first device.

In this embodiment of this application, after successfully transmitting the first RLC SDU to the fourth RLC entity, the first RLC entity of the first device transmits the first serial number to the PDCP entity of the first device. The first serial number is a serial number of the first RLC SDU. A split bearer corresponding to the PDCP entity includes a first RLC entity of the first device, a second RLC entity of the first device, a third RLC entity of a third device, and the fourth RLC entity of a second device. A transmission mode of the split bearer is duplicate transmission, and the RLC entities of the split bearer are in an acknowledged mode AM.

Optionally, the first device may be a terminal device. For example, as shown in FIG. 3, the first device may be a terminal device, the second device may be a secondary access network device, and the third device may be a master access network device. Alternatively, the first device may be a terminal device, the second device is a master access network device, and the third device is a secondary access network device.

For example, as shown in FIG. 4, the first device may be a terminal device, the second device and the third device are the same device, and the second device and the third device are a master access network device. As shown in FIG. 7, the first device may be a master access network device, the second device and the third device are the same device, and the second device and the third device are a terminal device.

903. The PDCP entity transmits a target serial number to the second RLC entity based on the first serial number.

In this embodiment of this application, after receiving the first serial number, the PDCP entity of the first device transmits the target serial number to the second RLC entity based on the first serial number.

904. The second RLC entity determines a second serial number based on the target serial number.

In this embodiment of this application, after receiving the target serial number, the second RLC entity determines the second serial number based on the target serial number. The second serial number is a serial number of a second RLC SDU, and the first RLC SDU is the same as the second RLC SDU.

905. The second RLC entity transmits the second serial number to the third RLC entity.

Optionally, after receiving a status report transmitted by the third RLC entity, the second RLC entity may transmit the second serial number to the third RLC entity. Alternatively, after determining the second serial number, the second RLC entity may transmit the second serial number to the third RLC entity immediately.

906. The third RLC entity marks the second serial number as a successfully received state.

In this embodiment of this application, after receiving the second serial number, the third RLC entity marks the second serial number as the successfully received state. To be specific, the target serial number is used for the second RLC entity to determine the second serial number and transmit the second serial number to the third RLC entity. The second serial number is used for the third RLC entity to mark the second serial number as the successfully received state.

It can be learned that, by implementing the method described in FIG. 9, after successfully transmitting the first RLC SDU, the first RLC entity of the first device notifies the first serial number of the first RLC SDU to the PDCP entity of the first device. The PDCP entity of the first device transmits the target serial number to the second RLC entity of the first device based on the first serial number. The second RLC entity may determine the second serial number based on the target serial number, and transmit the second serial number to the third RLC entity, and then the third RLC entity can mark the second serial number as the successfully received state. In this way, even if the second RLC entity does not successfully transmit the second RLC SDU to the third RLC entity, the second RLC entity does not retransmit the second RLC PDU corresponding to the second RLC SDU to the third RLC entity. Therefore, by implementing the method described in FIG. 9, waste of air interface overheads is reduced, and a transmission latency is reduced.

Optionally, the target serial number is the first serial number, or the target serial number is a PDCP serial number corresponding to the first serial number.

For example, the target serial number is the PDCP serial number corresponding to the first serial number. After receiving the first serial number transmitted by the first RLC entity, the first PDCP entity may determine, based on a prestored correspondence between a PDCP serial number and a serial number that is of an SDU and that is generated by the first RLC entity, the PDCP serial number corresponding to the first serial number, and then transmit the PDCP serial number corresponding to the first serial number to the second RLC entity.

Optionally, the target serial number is used for the second RLC entity to determine that the target serial number is the second serial number. To be specific, after receiving the target serial number, the second RLC entity determines that the target serial number is the second serial number of the second PDU.

For example, if the target serial number is the first serial number, the second RLC entity may directly determine that the first serial number is the second serial number. For another example, if the target serial number is the PDCP serial number corresponding to the first serial number, the second RLC entity may directly determine that the PDCP serial number corresponding to the first serial number is the second serial number.

Optionally, the target serial number is the PDCP serial number, and the PDCP serial number is used for the second RLC entity to determine, based on a prestored correspondence between the PDCP serial number and a serial number of an SDU, that a serial number corresponding to the target serial number is the second serial number. To be specific, after receiving the target serial number, the second RLC entity determines, based on a prestored correspondence between the PDCP serial number and a serial number that is of an SDU and that is generated by the second RLC entity, that a serial number corresponding to the target serial number is the second serial number.

It should be noted that, in the foregoing embodiment, each RLC entity of the split bearer is in the AM mode, and the split bearer is based on duplicate transmission. The master access network device may further transmit indication information to the terminal device. The indication information is used to indicate that the split bearer is based on duplicate transmission, so that the terminal device can perform duplicate transmission through the split bearer.

Figure 10:
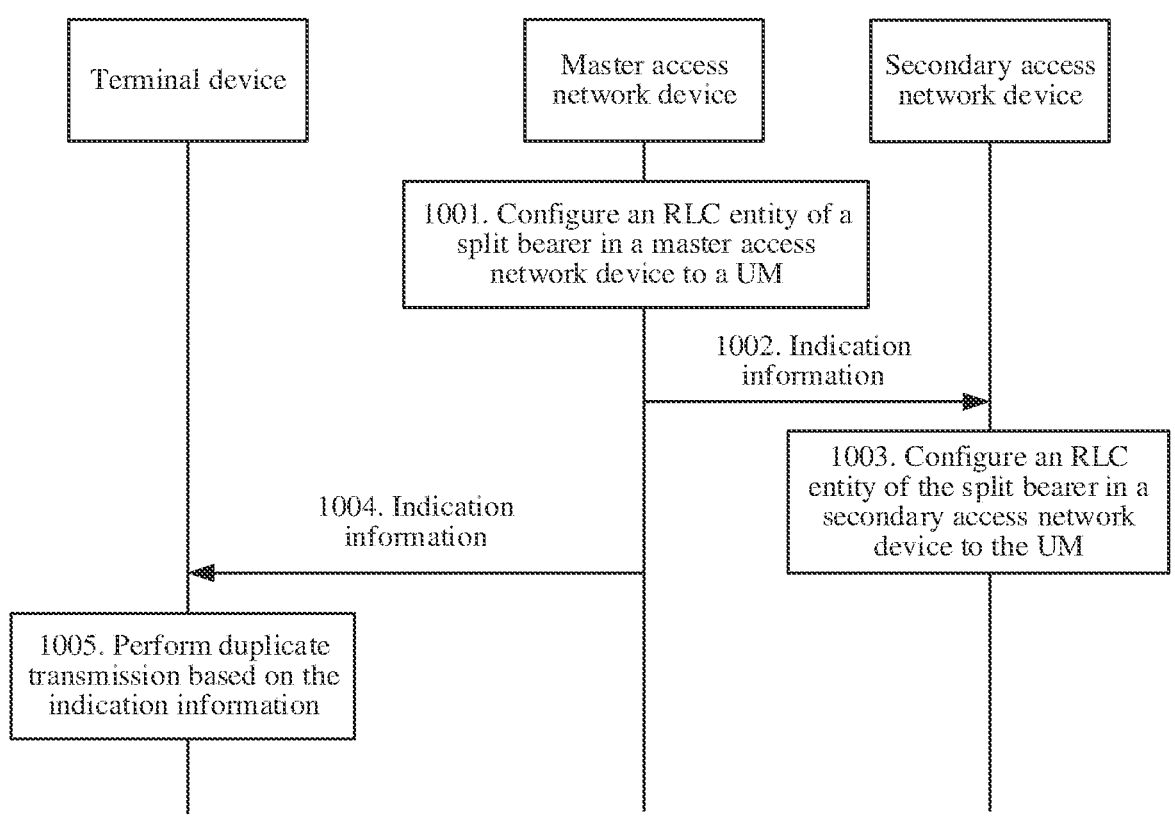
FIG. 10 to FIG. 14 are schematic flowcharts of duplicate transmission configuration according to embodiments of this application.

FIG. 10 shows a duplicate transmission configuration method according to an embodiment of this application. For a communications system applicable to the method, refer to the communications system shown in FIG. 3. As shown in FIG. 10, the duplicate transmission method includes the following steps 1001 to 1005.

1001. A master access network device configures an RLC entity of a split bearer in the master access network device to an unacknowledged mode (UM).

In this embodiment of this application, as shown in FIG. 3, RLC entities of the split bearer are located in the master access network device, the secondary access network device, and the terminal device separately. A transmission mode of the split bearer is duplicate transmission.

Optionally, when the master access network device determines that the transmission mode of the split bearer is duplicate transmission, the master access network device may configure the RLC entity of the split bearer in the master access network device to the UM. To be specific, the third RLC entity shown in FIG. 3 is configured to the UM.

1002. The master access network device transmits indication information to the secondary access network device.

The indication information is used to indicate that the transmission mode of the split bearer is duplicate transmission. The indication information is used to configure the RLC entity of the split bearer in the secondary access network device to the UM.

1003. The secondary access network device configures the RLC entity of the split bearer in the secondary access network device to the UM.

In this embodiment of this application, after receiving the indication information transmitted by the master access network device, the secondary access network device configures the RLC entity of the split bearer in the secondary access network device to the UM. To be specific, the fourth RLC entity shown in FIG. 3 is configured to the UM.

1004. The master access network device transmits the indication information to the terminal device.

The indication information is used for the terminal device to perform duplicate transmission.

1005. The terminal device performs duplicate transmission based on the indication information.

In this embodiment of this application, after receiving the indication information transmitted by the master access network device, the terminal device performs duplicate transmission based on the indication information. To be specific, for uplink transmission, after generating a PDCP PDU, the first PDCP entity of the terminal device delivers the PDCP PDU to the first RLC entity and the second RLC entity of the split bearer simultaneously. For example, the first RLC entity may transmit the PDCP PDU (that is, the RLC SDU) to the master access network device, and the second RLC entity transmits the same PDCP PDU to the secondary access network device. Alternatively, the first RLC entity transmits the PDCP PDU to the secondary access network device, and the second RLC entity transmits the same PDCP PDU to the master access network device.

In actual application, an RLC entity works in a UM mode or an AM mode. When packet loss is detected, the RLC entity in the AM can request an RLC entity at a transmit end to retransmit a packet. This is an automatic repeat request (ARQ) mechanism. The UM mode can support detection of packet loss and provide sorting and reassembly of packets. However, when packet loss is detected, the RLC entity in the UM does not request the RLC entity at the transmit end to retransmit the packet. For example, as shown in FIG. 3, if the third RLC entity of the master access network device and the fourth RLC entity of the secondary access network device are in the UM mode, the third RLC entity does not request the transmit end to retransmit an RLC PDU when the RLC PDU is not successfully received; and similarly, the fourth RLC entity does not request the transmit end to retransmit an RLC PDU when the RLC PDU is not successfully received.

It can be learned that, by implementing the method described in FIG. 10, if the split bearer is based on duplicate transmission and the RLC entities of the split bearer are in the AM mode, the master access network device may indicate, after configuring the RLC entity of the split bearer in the master access network device to the UM, that the split bearer of the secondary access network device is based on duplicate transmission, so that the secondary access network device can also configure the RLC entity of the split bearer in the secondary access network device to the UM. After the RLC entities of the split bearer in the master access network device and the secondary access network device are configured to the UM, if the third RLC entity of the master access network device does not successfully receive an RLC PDU, the third RLC entity does not request the transmit end to retransmit the RLC PDU not successfully received. Similarly, if the fourth RLC entity of the secondary access network device does not successfully receive an RLC PDU, the fourth RLC entity does not request the transmit end to retransmit the RLC PDU not successfully received. Therefore, by implementing the method described in FIG. 10, waste of air interface overheads is reduced, and a transmission latency is reduced.

Figure 11:
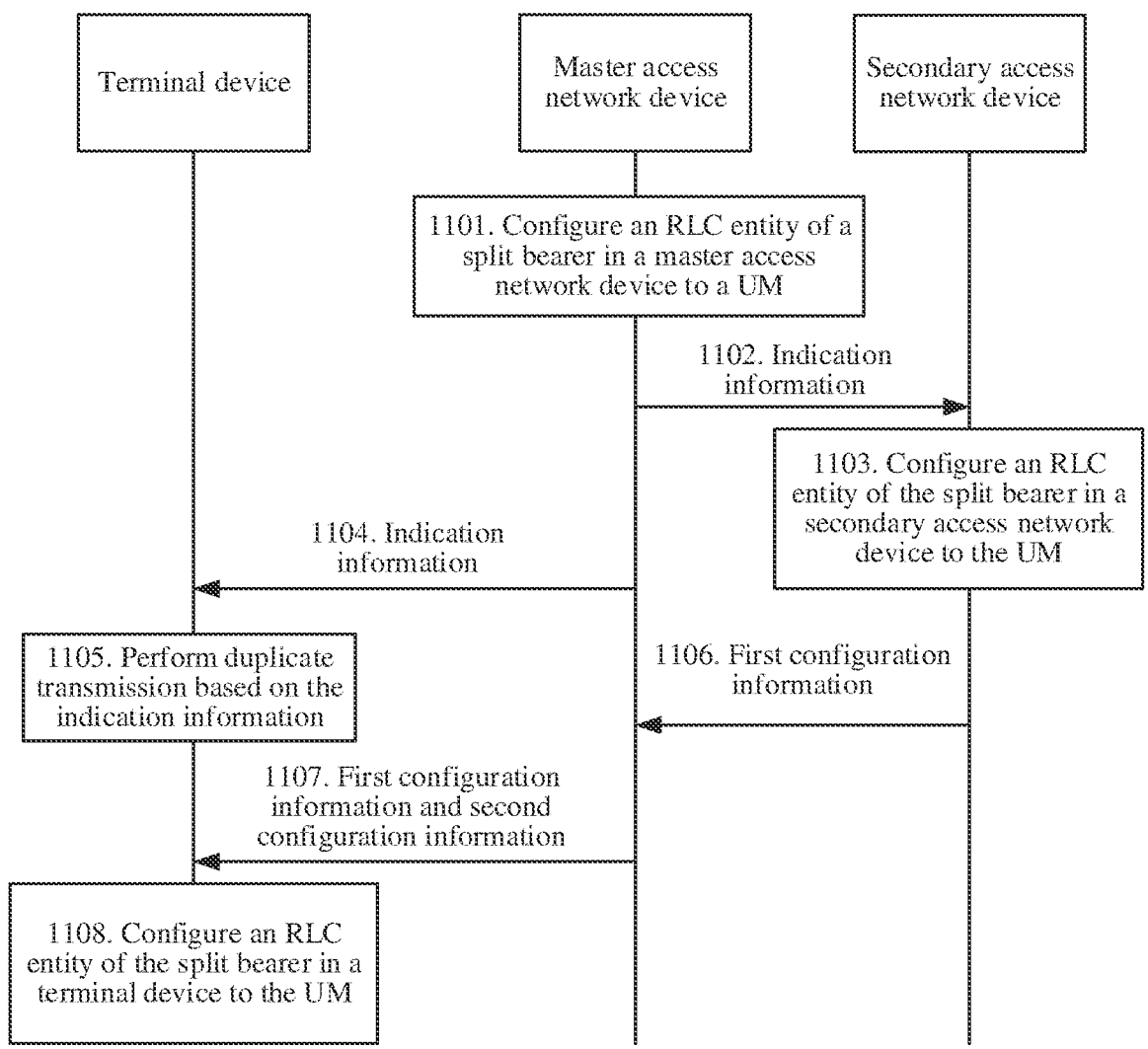

Optionally, as shown in FIG. 11, the secondary access network device, the master access network device, and the terminal device may further perform the following steps.

1106. The secondary access network device transmits first configuration information to the master access network device.

In this embodiment of this application, after configuring the RLC entity of the split bearer in the secondary access network device to the UM, the secondary access network device transmits the first configuration information to the master access network device. The first configuration information indicates that a mode of the RLC entity of the split bearer in the secondary access network device is the UM.

1107. The master access network device transmits the first configuration information and second configuration information to the terminal device.

In this embodiment of this application, the second configuration information indicates that a mode of the RLC entity of the split bearer in the master access network device is the UM, and the first configuration information and second configuration information are used to configure a mode of the RLC entity of the split bearer in the terminal device to the UM.

1108. The terminal device configures the mode of the RLC entity of the split bearer in the terminal device to the UM.

In this embodiment of this application, after receiving the first configuration information and the second configuration information that are transmitted by the master access network device, the terminal device configures the mode of the RLC entity of the split bearer in the terminal device to the UM.

For example, as shown in FIG. 3, after receiving the first configuration information and the second configuration information that are transmitted by the master access network device, the terminal device configures the modes of the first RLC entity and the second RLC entity to the UM. Therefore, when the first RLC entity does not successfully receive an RLC PDU, the second RLC entity does not request the transmit end to retransmit the RLC PDU. When the second RLC entity does not successfully receive an RLC PDU, the second RLC entity does not request the transmit end to retransmit the RLC PDU either, thereby reducing waste of air interface overheads and reducing a transmission latency.

Figure 12:
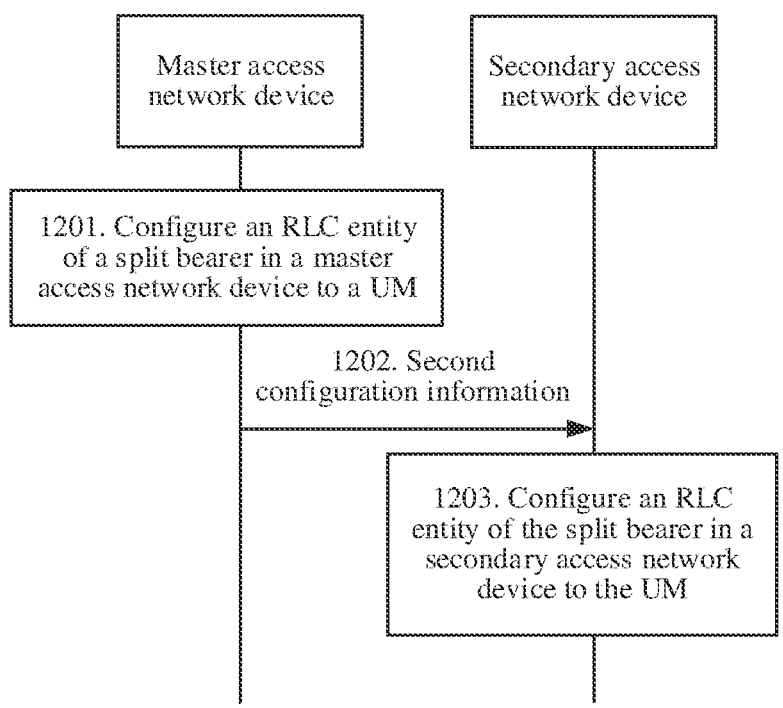

FIG. 12 is another duplicate transmission configuration method according to an embodiment of this application. For a communications system applicable to the method, refer to the communications system shown in FIG. 3. As shown in FIG. 12, the duplicate transmission method includes the following steps 1201 to 1205.

1201. A master access network device configures a mode of an RLC entity of a split bearer in the master access network device to a UM.

In this embodiment of this application, as shown in FIG. 3, RLC entities of the split bearer are located in the master access network device, the secondary access network device, and the terminal device separately. A transmission mode of the split bearer is duplicate transmission.

Optionally, when the master access network device determines that the transmission mode of the split bearer is duplicate transmission, the master access network device may configure the RLC entity of the split bearer in the master access network device to the UM. To be specific, the third RLC entity shown in FIG. 3 is configured to the UM.

1202. The master access network device transmits second configuration information to the secondary access network device.

In this embodiment of this application, after configuring the mode of the RLC entity of the split bearer in the master access network device to the UM, the master access network device transmits the second configuration information to the secondary access network device. The second configuration information indicates that the mode of the RLC entity of the split bearer in the master access network device is the UM, and the second configuration information is used to configure the RLC entity of the split bearer in the secondary access network device to the UM.

1203. The secondary access network device configures a mode of the RLC entity of the split bearer in the secondary access network device to the UM.

In this embodiment of this application, after receiving the second configuration information transmitted by the master access network device, the secondary access network device configures the mode of the RLC entity of the split bearer in the secondary access network device to the UM. To be specific, the RLC entity of the master access network device is in the UM mode. By default, the mode configured for the RLC entity of the secondary access network device is the same as that configured for the RLC entity of the master access network device.

It can be learned that, by implementing the method described in FIG. 12, if the split bearer is based on duplicate transmission and the RLC entities of the split bearer are in the AM mode, after the master access network device configures the RLC entity of the split bearer in the master access network device to the UM, the secondary access network device can also configure the RLC entity of the split bearer in the secondary access network device to the UM based on the configuration information of the master access network device. When packet loss is detected, the RLC entity in the UM does not request an RLC entity at a transmit end to retransmit a packet. Therefore, after the RLC entities of the split bearer in the master access network device and the secondary access network device are configured to the UM, if the third RLC entity of the master access network device does not successfully receive an RLC PDU, the third RLC entity does not request the transmit end to retransmit the RLC PDU not successfully received. Similarly, if the fourth RLC entity of the secondary access network device does not successfully receive an RLC PDU, the fourth RLC entity does not request the transmit end to retransmit the RLC PDU not successfully received. Therefore, by implementing the method described in FIG. 12, waste of air interface overheads is reduced, and a transmission latency is reduced.

Figure 13:
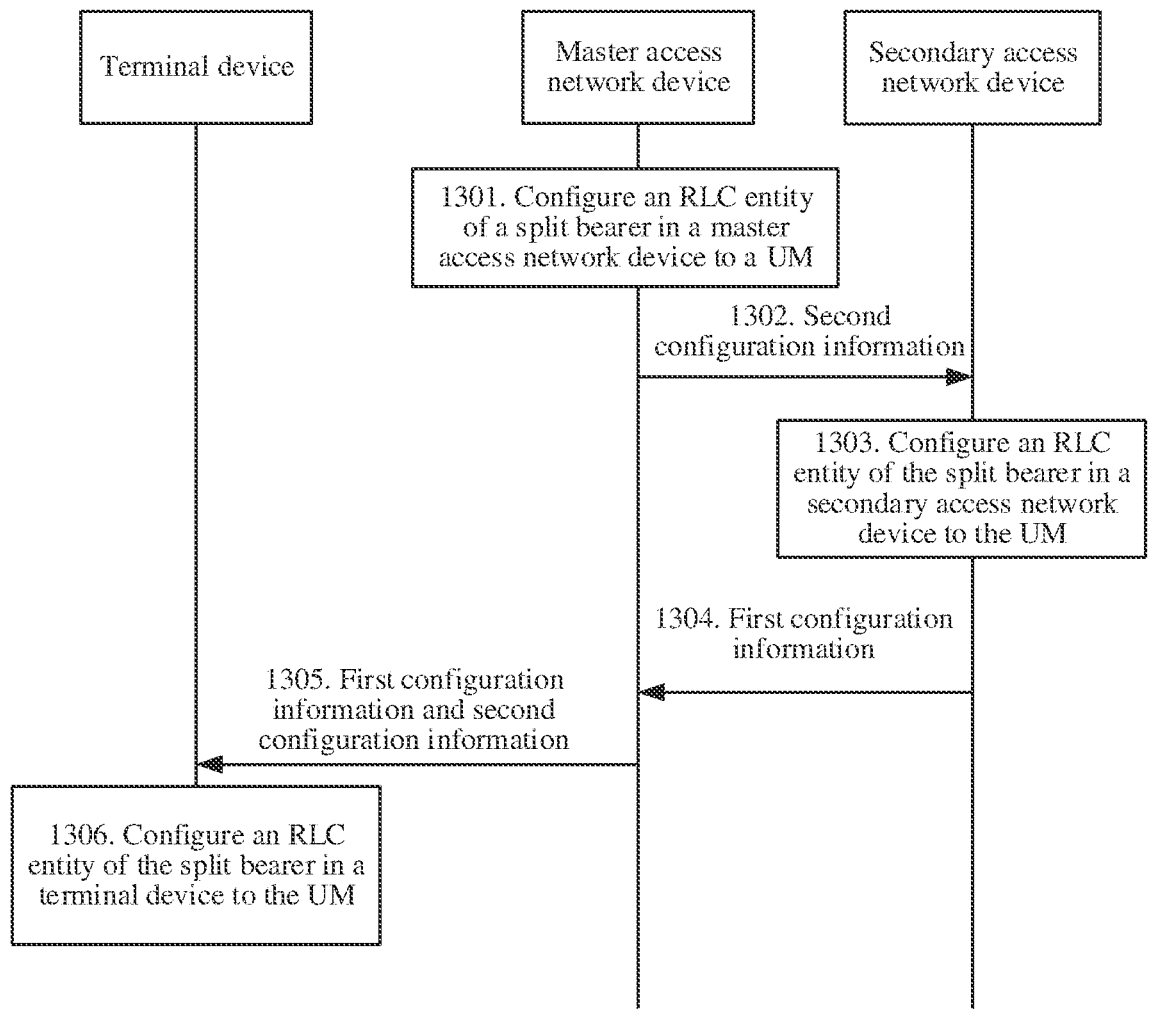

Optionally, as shown in FIG. 13, the secondary access network device, the master access network device, and the terminal device may further perform the following steps.

1304. The secondary access network device transmits first configuration information to the master access network device.

In this implementation, after configuring the mode of the RLC entity of the split bearer in the secondary access network device to the UM, the secondary access network device may transmit the first configuration information to the master access network device.

The first configuration information indicates that the mode of the RLC entity of the split bearer in the secondary access network device is the UM.

1305. The master access network device transmits the first configuration information and second configuration information to the terminal device.

In this implementation, after receiving the first configuration information transmitted by the secondary access network device, the master access network device may transmit the first configuration information and the second configuration information to the terminal device. The first configuration information and the second configuration information are used to configure the mode of the RLC entity of the split bearer in the terminal device to the UM.

1306. The terminal device configures the mode of the RLC entity of the split bearer in the terminal device to the UM.

In this implementation, after receiving the first configuration information and the second configuration information that are transmitted by the master access network device, the terminal device configures the mode of the RLC entity of the split bearer in the terminal device to the UM.

For example, as shown in FIG. 3, after receiving the first configuration information and the second configuration information that are transmitted by the master access network device, the terminal device configures the modes of the first RLC entity and the second RLC entity to the UM. Therefore, when the first RLC entity does not successfully receive an RLC PDU, the second RLC entity does not request the transmit end to retransmit the RLC PDU. When the second RLC entity does not successfully receive an RLC PDU, the second RLC entity does not request the transmit end to retransmit the RLC PDU either, thereby reducing waste of air interface overheads and reducing a transmission latency.

Figure 14:
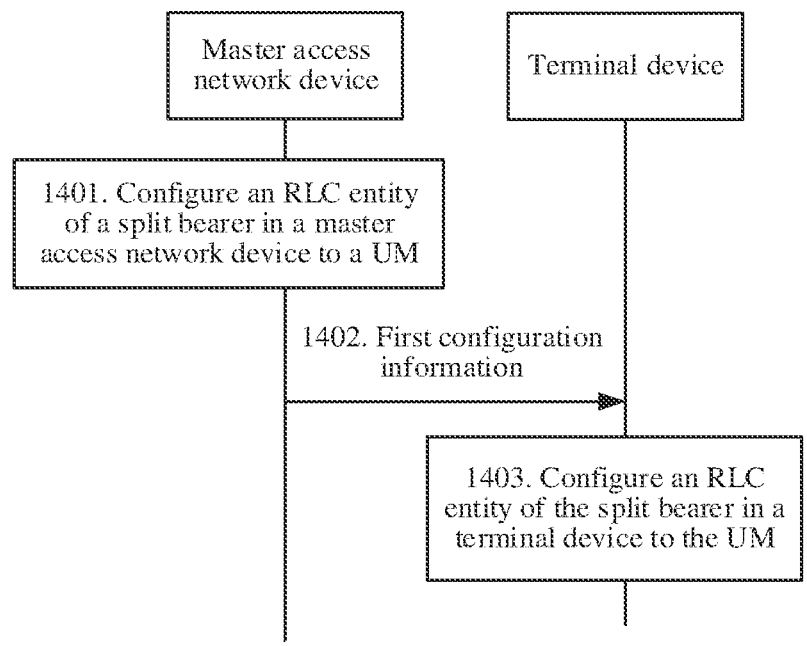

FIG. 14 is another duplicate transmission configuration method according to an embodiment of this application. For a communications system applicable to the method, refer to the communications system shown in FIG. 3. As shown in FIG. 14, the duplicate transmission method includes the following steps 1401 to 1403.

1401. A master access network device configures modes of all RLC entities of a split bearer in the master access network device to a UM mode.

In this embodiment of this application, as shown in FIG. 4, the RLC entities of the split bearer are located in the master access network device and the terminal device separately, and a transmission mode of the split bearer is duplicate transmission.

1402. The master access network device transmits first configuration information to the terminal device.

In this embodiment of this application, the first configuration information indicates that the modes of all the RLC entities of the split bearer in the master access network device are the UM. The first configuration information is used to configure modes of all RLC entities of the split bearer in the terminal device to the UM.

1403. The terminal device configures the modes of all the RLC entities of the split bearer in the terminal device to the UM.

In this embodiment of this application, after receiving the first configuration information transmitted by the master access network device, the terminal device configures the mode of all the RLC entities of the split bearer in the terminal device to the UM.

It can be learned that, by implementing the method described in FIG. 14, if the split bearer is based on duplicate transmission and the RLC entities of the split bearer are in the AM mode, the master access network device may transmit, after configuring the RLC entities of the split bearer in the master access network device to the UM, the first configuration information of the master access network device to the terminal device, so that the terminal device can configure the RLC entities of the split bearer in the terminal device to the UM based on the first configuration information. When packet loss is detected, the RLC entity in the UM does not request an RLC entity at a transmit end to retransmit a packet. Therefore, after the RLC entities of the split bearer in the master access network device and the terminal device are configured to the UM, if an RLC entity of the master access network device does not successfully receive an RLC PDU, the RLC entity of the master access network device does not request the transmit end to retransmit the RLC PDU not successfully received. Similarly, if an RLC entity of the terminal device does not successfully receive an RLC PDU, the RLC entity of the terminal device does not request the transmit end to retransmit the RLC PDU not successfully received. Therefore, by implementing the method described in FIG. 14, waste of air interface overheads is reduced, and a transmission latency is reduced.

In the embodiments of the present invention, functional units of apparatuses may be divided based on the foregoing method examples. For example, the functional units may be divided corresponding to functions, or two or more functions may be integrated in one unit. The integrated unit may be implemented in a form of hardware, or may be implemented in a form of a software functional unit. It should be noted that, in this embodiment of the present invention, unit division is exemplary, and is merely a logical function division. In actual implementation, another division manner may be used.

Figure 15:
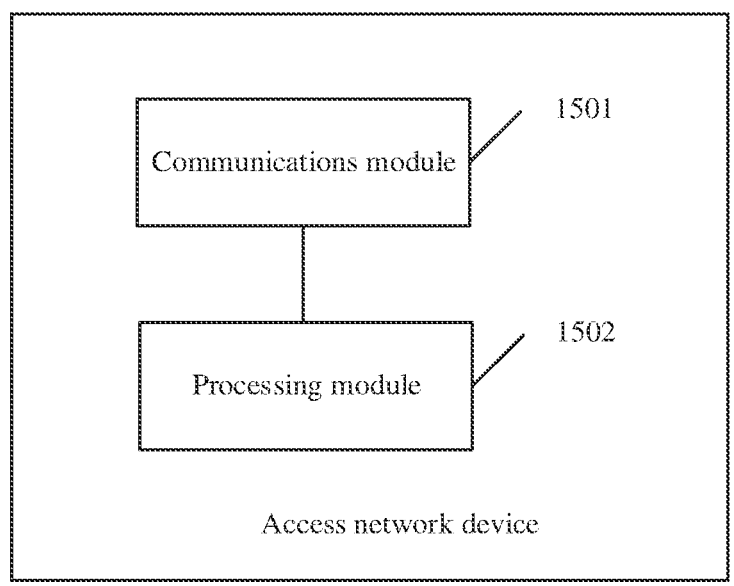
FIG. 15 is a schematic structural diagram of an access network device according to an embodiment of this application.

FIG. 15 is a schematic structural diagram of an access network device according to an embodiment of the present invention. The access network device may be the first access network device shown in FIG. 5 in the foregoing method embodiments. The access network device includes: a communications module 1501 and a processing module 1502.

The communications module 1501 is configured to receive a target serial number transmitted by a second access network device, where the target serial number is obtained based on a first serial number, the first serial number is a serial number of a first radio link control service data unit RLC SDU successfully received by the second access network device, the access network device, the second access network device, and a terminal device each include an RLC entity of a split bearer, a transmission mode of the split bearer is duplicate transmission, and the RLC entities of the split bearer are in an acknowledged mode AM.

The processing module 1502 is configured to obtain a second serial number based on the target serial number, where the second serial number is a serial number of a second RLC SDU, and the first RLC SDU is the same as the second RLC SDU.

The processing module 1502 is further configured to mark the second serial number as a successfully received state.

Optionally, the target serial number is the first serial number, or the target serial number is a packet data convergence protocol PDCP serial number corresponding to the first serial number.

Optionally, a specific manner of obtaining the second serial number by the processing module 1502 based on the target serial number is: determining that the target serial number is the second serial number.

Optionally, the target serial number is the PDCP serial number, and a specific manner of obtaining the second serial number by the processing module 1502 based on the target serial number is: determining, based on a prestored correspondence between the PDCP serial number and a serial number of an RLC SDU, that a serial number corresponding to the target serial number is the second serial number.

Optionally, the communications module 1501 is further configured to: after the processing module 1502 marks the second serial number as the successfully received state, transmit a status report not including the second serial number to the terminal device.

Figure 16:
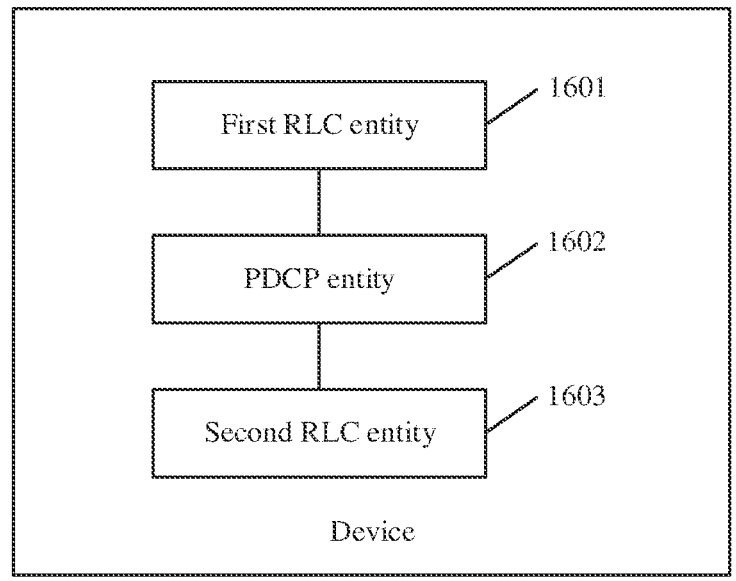
FIG. 16 is a schematic structural diagram of a device according to an embodiment of this application.

FIG. 16 is a schematic structural diagram of a device according to an embodiment of the present invention. The device may be the first device shown in FIG. 6 in the foregoing method embodiments. The device includes: a first RLC entity 1601, a PDCP entity 1602, and a second RLC entity 1603.

The PDCP entity 1602 is configured to receive a first serial number transmitted by the first RLC entity 1601, where the first serial number is a serial number of a first radio link control service data unit RLC SDU successfully received by the first RLC entity 1601, a split bearer corresponding to the PDCP entity 1602 includes the first RLC entity 1601 and the second RLC entity 1603, a transmission mode of the split bearer is duplicate transmission, and the RLC entities of the split bearer are in an acknowledged mode AM.

The PDCP entity 1602 is further configured to transmit a target serial number to the second RLC entity 1603 based on the first serial number, where the target serial number is used for the second RLC entity 1603 to determine a second serial number and to mark the second serial number as a successfully received state, the second serial number is a serial number of a second RLC SDU, and the first RLC SDU is the same as the second RLC SDU.

Optionally, the target serial number is the first serial number, or the target serial number is a packet data convergence protocol PDCP serial number corresponding to the first serial number.

Optionally, the target serial number is used for the second RLC entity 1603 to determine that the target serial number is the second serial number of a second PDU.

Optionally, the target serial number is the PDCP serial number, and the PDCP serial number is used for the second RLC entity 1603 to determine, based on a prestored correspondence between the PDCP serial number and a serial number of an RLC SDU, that a serial number corresponding to the target serial number is the second serial number.

Optionally, an RLC entity of the split bearer is further located in a second device, and the second RLC entity 1603 is configured to transmit, after marking the second serial number as the successfully received state, a status report not including the second serial number to the second device.

Figure 17:
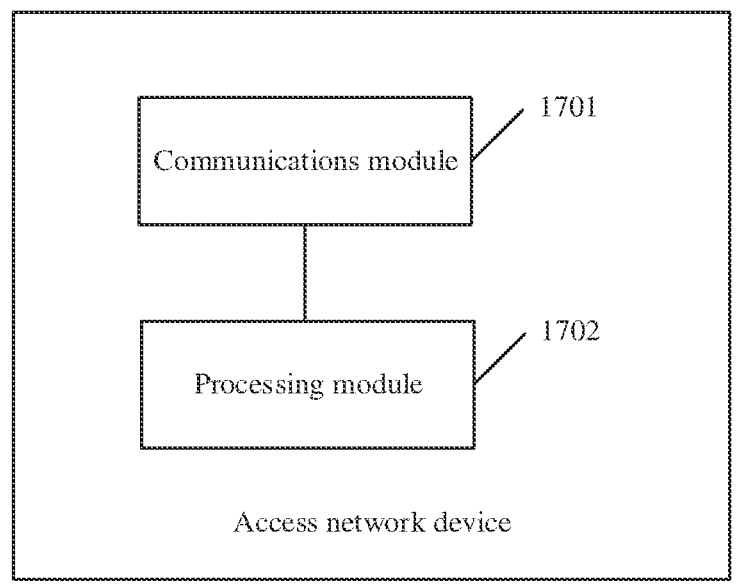
FIG. 17 is a schematic structural diagram of an access network device according to an embodiment of this application.

FIG. 17 is a schematic structural diagram of an access network device according to an embodiment of the present invention. The device may be the first access network device shown in FIG. 8 in the foregoing method embodiments. The access network device includes: a communications module 1701 and a processing module 1702.

The communications module 1701 is configured to receive a target serial number transmitted by a second access network device, where the target serial number is obtained based on a first serial number, the first serial number is a serial number of a first radio link control service data unit RLC SDU successfully transmitted by the second access network device to a terminal device, the access network device, the second access network device, and the terminal device each include an RLC entity of a split bearer, a transmission mode of the split bearer is duplicate transmission, and the RLC entities of the split bearer are in an acknowledged mode AM.

The processing module 1702 is configured to obtain a second serial number based on the target serial number, where the second serial number is a serial number of a second RLC SDU, and the first RLC SDU is the same as the second RLC SDU.

The communications module 1701 is further configured to transmit the second serial number to the terminal device, where the second serial number is used for the terminal device to mark the second serial number as a successfully received state.

Optionally, the target serial number is the first serial number, or the target serial number is a packet data convergence protocol PDCP serial number corresponding to the first serial number.

Optionally, a specific manner of obtaining the second serial number by the processing module 1702 based on the target serial number is: determining that the target serial number is the second serial number.

Optionally, the target serial number is the PDCP serial number, and a specific manner of obtaining the second serial number by the processing module 1702 based on the target serial number is: determining, based on a prestored correspondence between the PDCP serial number and a serial number of an RLC SDU, that a serial number corresponding to the target serial number is the second serial number.

Figure 18:
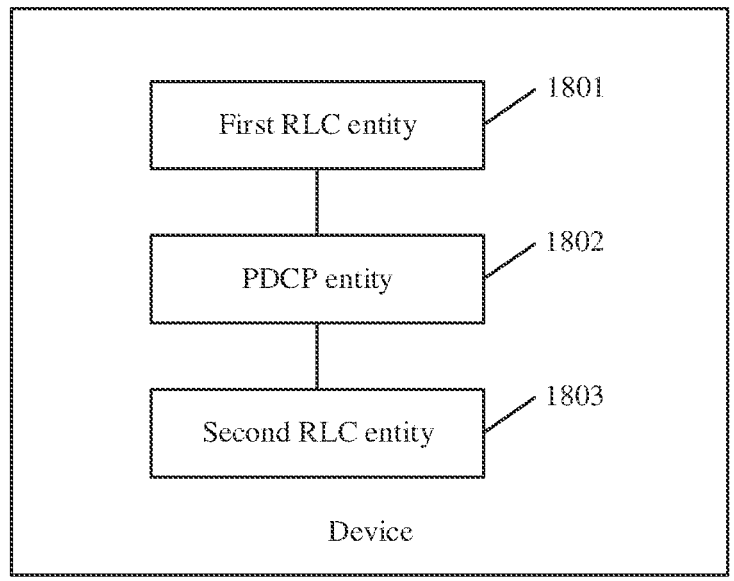
FIG. 18 is a schematic structural diagram of a device according to an embodiment of this application.

FIG. 18 is a schematic structural diagram of a device according to an embodiment of the present invention. The device may be the first device shown in FIG. 9 in the foregoing method embodiments. The device includes: a first RLC entity 1801, a PDCP entity 1802, and a second RLC entity 1803.

The PDCP entity 1802 is configured to receive a first serial number transmitted by the first RLC entity 1801, where the first serial number is a serial number of a first radio link control service data unit RLC SDU successfully transmitted by the first RLC entity 1801 to a fourth RLC entity, a split bearer corresponding to the PDCP entity 1802 includes the first RLC entity 1801 of the device, the second RLC entity 1803 of the device, a third RLC entity of a third device, and the fourth RLC entity of a second device, a transmission mode of the split bearer is duplicate transmission, and the RLC entities of the split bearer are in an acknowledged mode AM.

The PDCP entity 1802 is further configured to transmit a target serial number to the second RLC entity 1803 based on the first serial number, where the target serial number is used for the second RLC entity 1803 to determine a second serial number and to transmit the second serial number to the third RLC entity, the second serial number is a serial number of a second RLC SDU, the first RLC SDU is the same as the second RLC SDU, and the second serial number is used for the third RLC entity to mark the second serial number as a successfully received state.

Optionally, the target serial number is the first serial number, or the target serial number is a PDCP serial number corresponding to the first serial number.

Optionally, the target serial number is used for the second RLC entity 1803 to determine that the target serial number is the second serial number.

Optionally, the target serial number is the PDCP serial number, and the target serial number is used for the second RLC entity 1803 to determine, based on a prestored correspondence between the PDCP serial number and a serial number of an RLC SDU, that a serial number corresponding to the target serial number is the second serial number.

Figure 19:
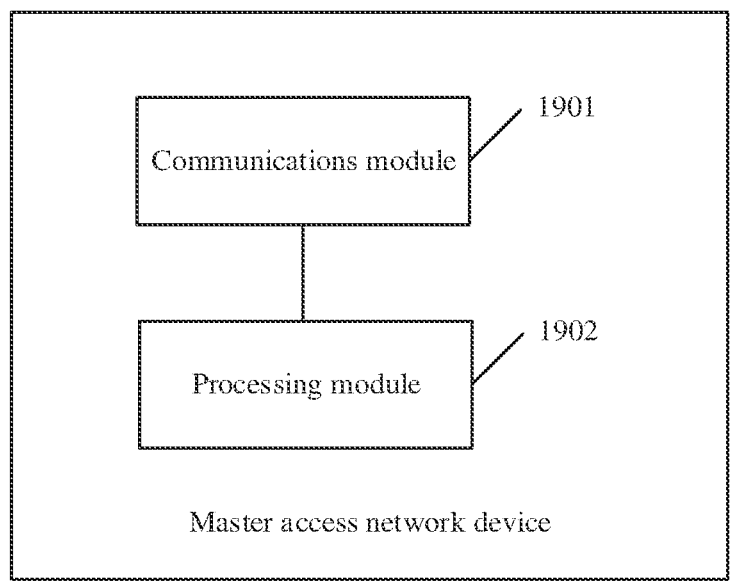
FIG. 19 is a schematic structural diagram of a master access network device according to an embodiment of this application.

FIG. 19 is a schematic structural diagram of a master access network device according to an embodiment of the present invention. The master access network device may be the master access network device shown in FIG. 10 or FIG. 11 in the foregoing method embodiments. The master access network device includes: a communications module 1901 and a processing module 1902.

The processing module 1902 is configured to configure a radio link control RLC entity of a split bearer in the master access network device to an unacknowledged mode UM, where RLC entities of the split bearer are located in the master access network device, a secondary access network device, and a terminal device separately.

The communications module 1901 is configured to transmit indication information to the secondary access network device, where the indication information is used to indicate that a transmission mode of the split bearer is duplicate transmission, and the indication information is used to configure the RLC entity of the split bearer in the secondary access network device to the UM.

The communications module 1901 is further configured to transmit indication information to the terminal device, where the indication information is used for the terminal device to perform duplicate transmission.

Optionally, the communications module 1901 is further configured to receive first configuration information transmitted by the secondary access network device, where the first configuration information indicates that a mode of the RLC entity of the split bearer in the secondary access network device is the UM.

The communications module 1901 is further configured to transmit the first configuration information and second configuration information to the terminal device, where the second configuration information indicates that a mode of the RLC entity of the split bearer in the master access network device is the UM, and the first configuration information and the second configuration information are used to configure a mode of the RLC entity of the split bearer in the terminal device to the UM.

Figure 20:
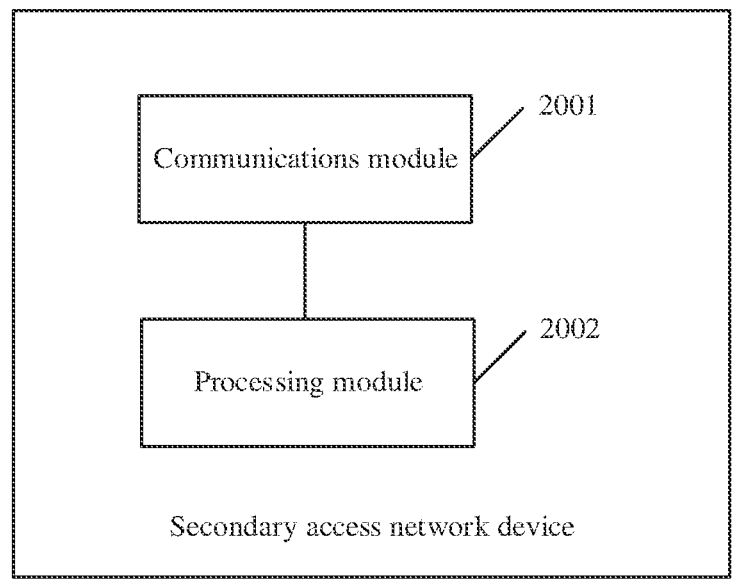
FIG. 20 is a schematic structural diagram of a secondary access network device according to an embodiment of this application.

FIG. 20 is a schematic structural diagram of a secondary access network device according to an embodiment of the present invention. The secondary access network device may be the secondary access network device shown in FIG. 10 or FIG. 11 in the foregoing method embodiments. The secondary access network device includes: a communications module 2001 and a processing module 2002.

The communications module 2001 is configured to receive indication information transmitted by a master access network device, where the indication information is used to indicate that a transmission mode of a split bearer is duplicate transmission, and RLC entities of the split bearer are located in the master access network device, the secondary access network device, and a terminal device separately.

The processing module 2002 is configured to configure the RLC entity of the split bearer in the secondary access network device to an unacknowledged mode UM.

Optionally, the communications module 2001 is further configured to transmit first configuration information to the master access network device, where the first configuration information indicates that a mode of the RLC entity of the split bearer in the secondary access network device is the UM.

Figure 21:
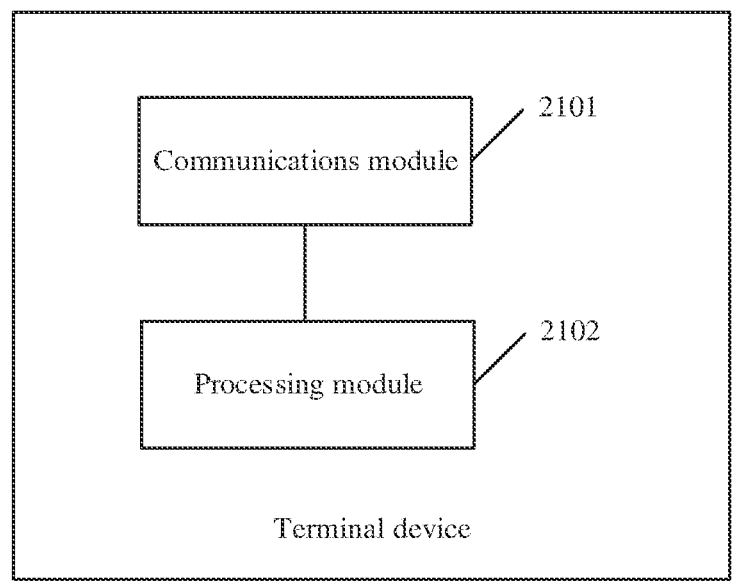
FIG. 21 is a schematic structural diagram of a terminal device according to an embodiment of this application.

FIG. 21 is a schematic structural diagram of a terminal device according to an embodiment of the present invention. The terminal device may be the terminal device shown in FIG. 10 or FIG. 11 in the foregoing method embodiments. The terminal device includes: a communications module 2101 and a processing module 2102.

The communications module 2101 is configured to receive indication information transmitted by a master access network device, where the indication information is used to indicate that a transmission mode of a split bearer is duplicate transmission, and RLC entities of the split bearer are located in the master access network device, a secondary access network device, and the terminal device separately.

The communications module 2101 is further configured to perform duplicate transmission based on the indication information.

The communications module 2101 is further configured to receive first configuration information and second configuration information that are transmitted by the master access network device, where the first configuration information indicates that a mode of the RLC entity of the split bearer in the secondary access network device is an unacknowledged mode UM, and the second configuration information indicates that a mode of the RLC entity of the split bearer in the master access network device is the UM.

The processing module 2102 is configured to configure a mode of the RLC entity of the split bearer in the terminal device to the UM.

Figure 22:
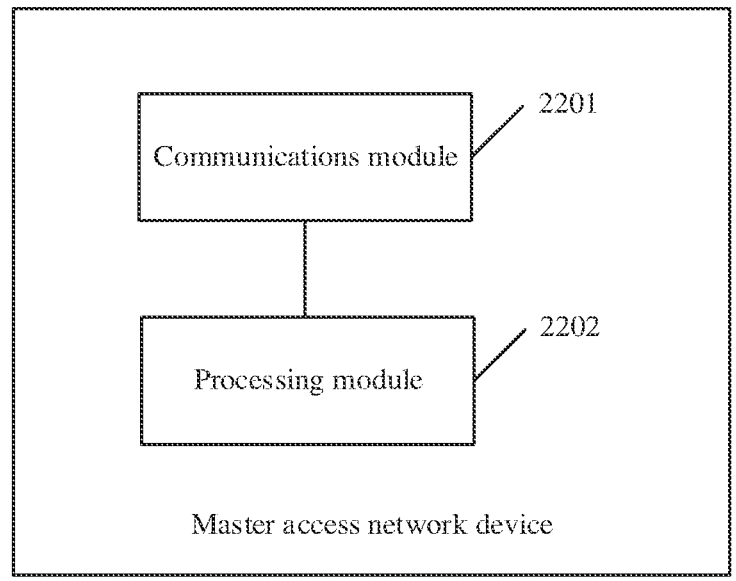
FIG. 22 is a schematic structural diagram of a master access network device according to an embodiment of this application.

FIG. 22 is a schematic structural diagram of a master access network device according to an embodiment of the present invention. The master access network device may be the master access network device shown in FIG. 12 or FIG. 13 in the foregoing method embodiments. The master access network device includes: a communications module 2201 and a processing module 2202.

The processing module 2202 is configured to configure a mode of a radio link control RLC entity of a split bearer in the master access network device to an unacknowledged mode UM, where RLC entities of the split bearer are located in the master access network device, a secondary access network device, and a terminal device separately, and a transmission mode of the split bearer is duplicate transmission. The communications module 2201 is configured to transmit second configuration information to the secondary access network device, where the second configuration information indicates that a mode of the RLC entity of the split bearer in the master access network device is the UM, and the second configuration information is used to configure the RLC entity of the split bearer in the secondary access network device to the UM.

Optionally, the communications module 2201 is further configured to receive first configuration information transmitted by the secondary access network device, where the first configuration information indicates that a mode of the RLC entity of the split bearer in the secondary access network device is the UM. The communications module 2201 is further configured to transmit the first configuration information and second configuration information to the terminal device, where the first configuration information and the second configuration information are used to configure a mode of the RLC entity of the split bearer in the terminal device to the UM.

Figure 23:
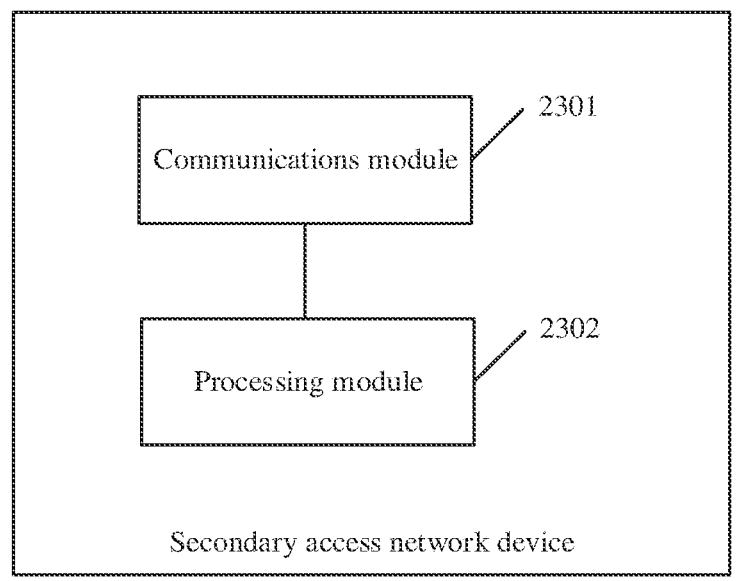
FIG. 23 is a schematic structural diagram of a secondary access network device according to an embodiment of this application.

FIG. 23 is a schematic structural diagram of a secondary access network device according to an embodiment of the present invention. The secondary access network device may be the secondary access network device shown in FIG. 12 or FIG. 13 in the foregoing method embodiments. The secondary access network device includes: a communications module 2301 and a processing module 2302.

The communications module 2301 is configured to receive second configuration information transmitted by a master access network device, where the second configuration information indicates that a mode of a radio link control RLC entity of a split bearer in the master access network device is an unacknowledged mode UM, RLC entities of the split bearer are located in the master access network device, the secondary access network device, and a terminal device separately, and a transmission mode of the split bearer is duplicate transmission. The processing module 2302 is configured to configure a mode of the RLC entity of the split bearer in the secondary access network device to the UM.

Optionally, the communications module 2301 is further configured to transmit first configuration information to the master access network device, where the first configuration information indicates that a mode of the RLC entity of the split bearer in the secondary access network device is the UM.

Figure 24:
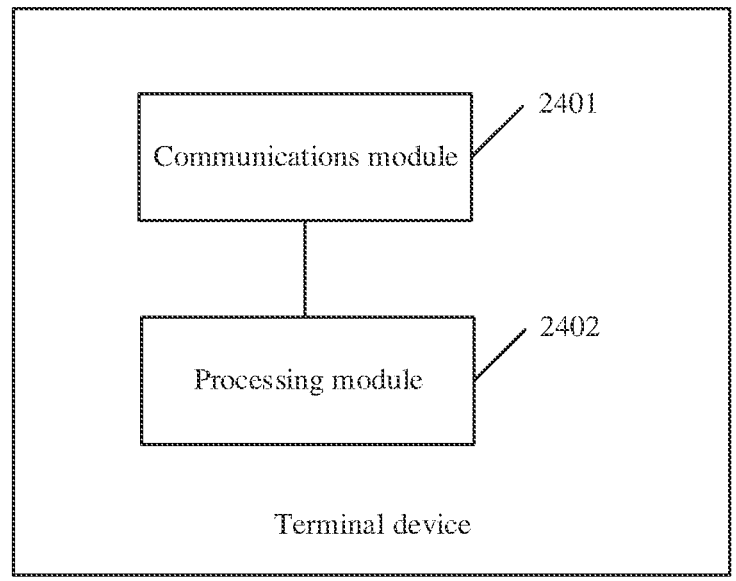
FIG. 24 is a schematic structural diagram of a terminal device according to an embodiment of this application.

FIG. 24 is a schematic structural diagram of a terminal device according to an embodiment of the present invention. The terminal device may be the terminal device shown in FIG. 12 or FIG. 13 in the foregoing method embodiments. The terminal device includes: a communications module 2401 and a processing module 2402.

The communications module 2401 is configured to receive first configuration information and second configuration information that are transmitted by a master access network device, where the first configuration information indicates that a mode of a radio link control RLC entity of a split bearer in a secondary access network device is an unacknowledged mode UM, the second configuration information indicates that a mode of an RLC entity of the split bearer in the master access network device is the UM, RLC entities of the split bearer are located in the master access network device, the secondary access network device, and the terminal device separately, and a transmission mode of the split bearer is duplicate transmission. The processing module 2402 is configured to configure a mode of the RLC entity of the split bearer in the terminal device to the UM.

Figure 25:
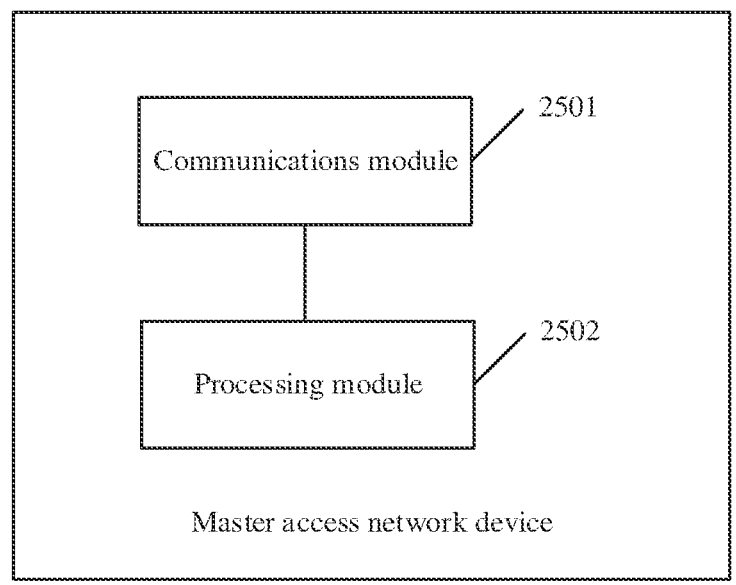
FIG. 25 is a schematic structural diagram of a master access network device according to an embodiment of this application.

FIG. 25 is a schematic structural diagram of a master access network device according to an embodiment of the present invention. The master access network device may be the master access network device shown in FIG. 14 in the foregoing method embodiments. The master access network device includes: a communications module 2501 and a processing module 2502.

The processing module 2502 is configured to configure modes of all RLC entities of a split bearer in the master access network device to a UM mode, where RLC entities of the split bearer are located in the master access network device and a terminal device separately, and a transmission mode of the split bearer is duplicate transmission. The communications module 2501 is configured to transmit first configuration information to the terminal device, where the first configuration information indicates that the modes of all the RLC entities of the split bearer in the master access network device are the UM, and the first configuration information is used to configure modes of all RLC entities of the split bearer in the terminal device to the UM.

Figure 26:
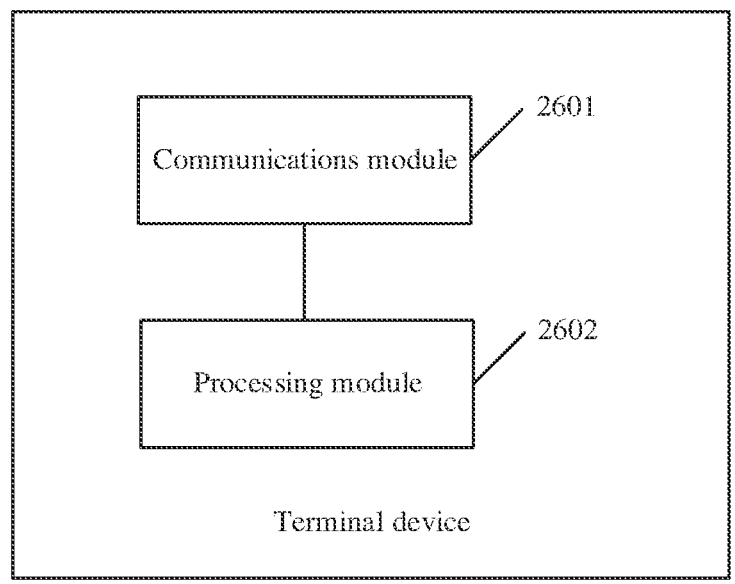
FIG. 26 is a schematic structural diagram of a terminal device according to an embodiment of this application.

FIG. 26 is a schematic structural diagram of a terminal device according to an embodiment of the present invention. The terminal device may be the terminal device shown in FIG. 14 in the foregoing method embodiments. The terminal device includes: a communications module 2601 and a processing module 2602.

The communications module 2601 is configured to receive first configuration information transmitted by a master access network device, where the first configuration information indicates that modes of all RLC entities of a split bearer in the master access network device are a UM, RLC entities of the split bearer are located in the master access network device and the terminal device separately, and a transmission mode of the split bearer is duplicate transmission. The processing module 2602 is configured to configure modes of all RLC entities of the split bearer in the terminal device to the UM.

Figure 27:
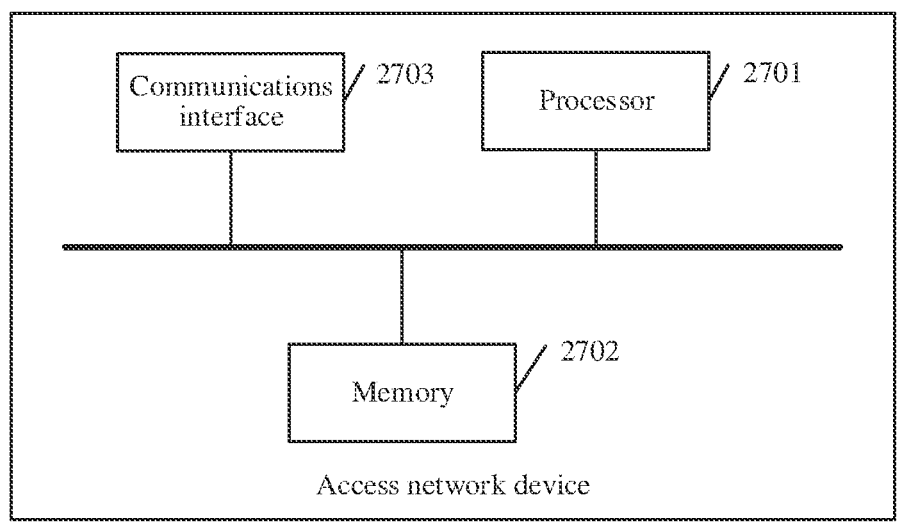
FIG. 27 is a schematic structural diagram of an access network device according to an embodiment of this application.

FIG. 27 is a schematic structural diagram of an access network device according to an embodiment of this application. The access network device may be the first access network device shown in FIG. 5 or FIG. 8 in the foregoing method embodiments. As shown in FIG. 27, the access network device 2700 includes a processor 2701, a memory 2702, and a communications interface 2703. The processor 2701, the memory 2702, and the communications interface 2703 are connected.

The processor 2701 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. Alternatively, the processor 2701 may be a combination of processors implementing a computing function, for example, a combination of one or more microprocessors, or a combination of the DSP and a microprocessor.

The communications interface 2703 is configured to implement communication with other network elements (such as a terminal device and a second access network device).

The processor 2701 invokes program code stored in the memory 2702 to perform the steps that are performed by the first access network device described in FIG. 5 or FIG. 8 in the foregoing method embodiments.

Figure 28:
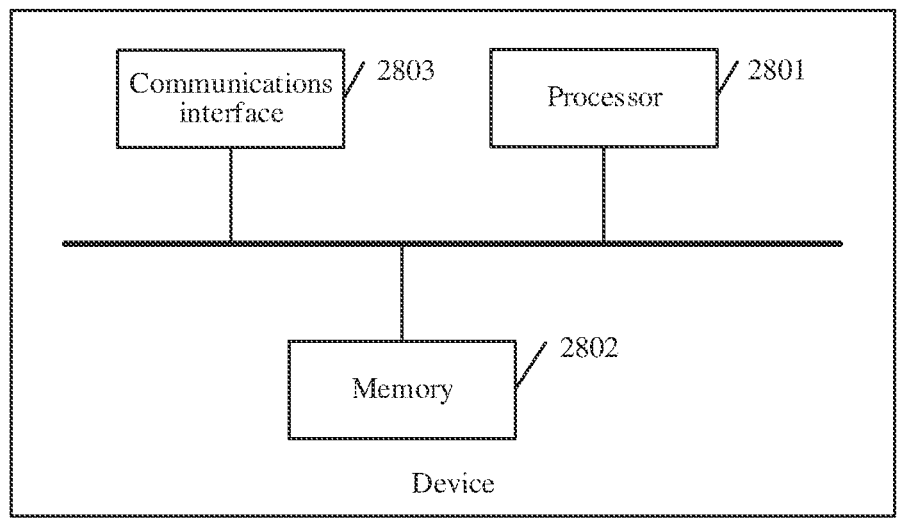
FIG. 28 is a schematic structural diagram of a device according to an embodiment of this application.

FIG. 28 is a schematic structural diagram of a device according to an embodiment of this application. The device may be the first device shown in FIG. 6 or FIG. 9 in the foregoing method embodiments. As shown in FIG. 28, the access network device 2800 includes a processor 2801, a memory 2802, and a communications interface 2803. The processor 2801, the memory 2802, and the communications interface 2803 are connected.

The processor 2801 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. Alternatively, the processor 2801 may be a combination of processors implementing a computing function, for example, a combination of one or more microprocessors, or a combination of the DSP and a microprocessor.

The communications interface 2803 is configured to implement communication with other network elements (such as a terminal device or an access network device).

The processor 2801 invokes program code stored in the memory 2802 to perform one or more steps that are performed by the first device described in FIG. 6 or FIG. 9 in the foregoing method embodiments.

Figure 29:
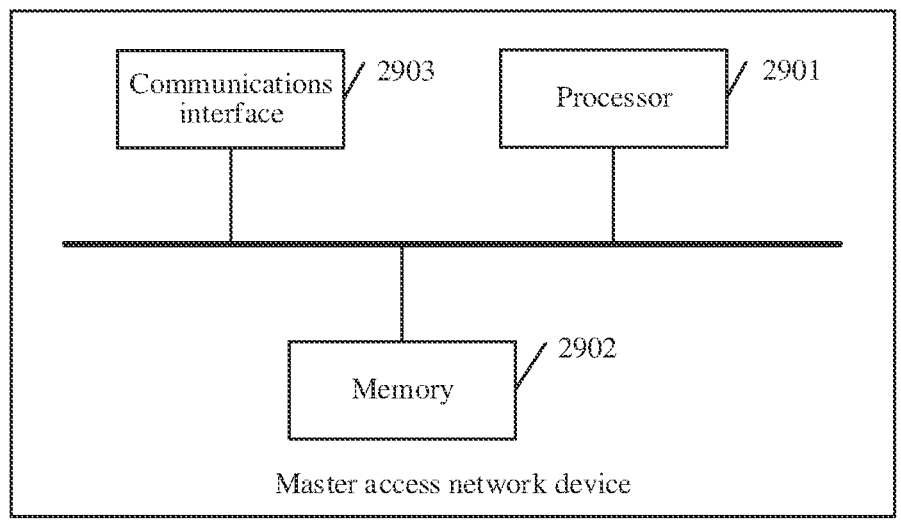
FIG. 29 is a schematic structural diagram of a master access network device according to an embodiment of this application.

FIG. 29 is a schematic structural diagram of a master access network device according to an embodiment of this application. The master access network device may be the master access network device shown in any one of FIG. 10 to FIG. 14 in the foregoing method embodiments. As shown in FIG. 29, the master access network device 2900 includes a processor 2901, a memory 2902, and a communications interface 2903. The processor 2901, the memory 2902, and the communications interface 2903 are connected.

The processor 2901 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. Alternatively, the processor 2901 may be a combination of processors implementing a computing function, for example, a combination of one or more microprocessors, or a combination of the DSP and a microprocessor.

The communications interface 2903 is configured to implement communication with other network elements (such as a terminal device and a secondary access network device).

The processor 2901 invokes program code stored in the memory 2902 to perform the steps that are performed by the master access network device described in any one of FIG. 10 to FIG. 14 in the foregoing method embodiments.

Figure 30:
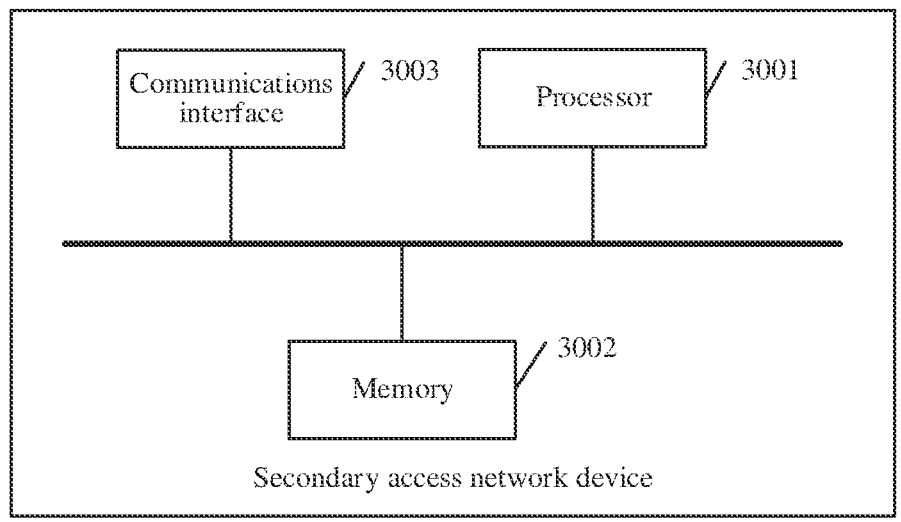
FIG. 30 is a schematic structural diagram of a secondary access network device according to an embodiment of this application.

FIG. 30 is a schematic structural diagram of a secondary access network device according to an embodiment of this application. The secondary access network device may be the secondary access network device shown in any one of FIG. 10 to FIG. 13 in the foregoing method embodiments.

As shown in FIG. 30, the secondary access network device 3000 includes a processor 3001, a memory 3002, and a communications interface 3003. The processor 3001, the memory 3002, and the communications interface 3003 are connected.

The processor 3001 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. Alternatively, the processor 3001 may be a combination of processors implementing a computing function, for example, a combination of one or more microprocessors, or a combination of the DSP and a microprocessor.

The communications interface 3003 is configured to implement communication with other network elements (such as a terminal device and a master access network device).

The processor 3001 invokes program code stored in the memory 3002 to perform the steps that are performed by the secondary access network device described in any one of FIG. 10 to FIG. 13 in the foregoing method embodiments.

Figure 31:
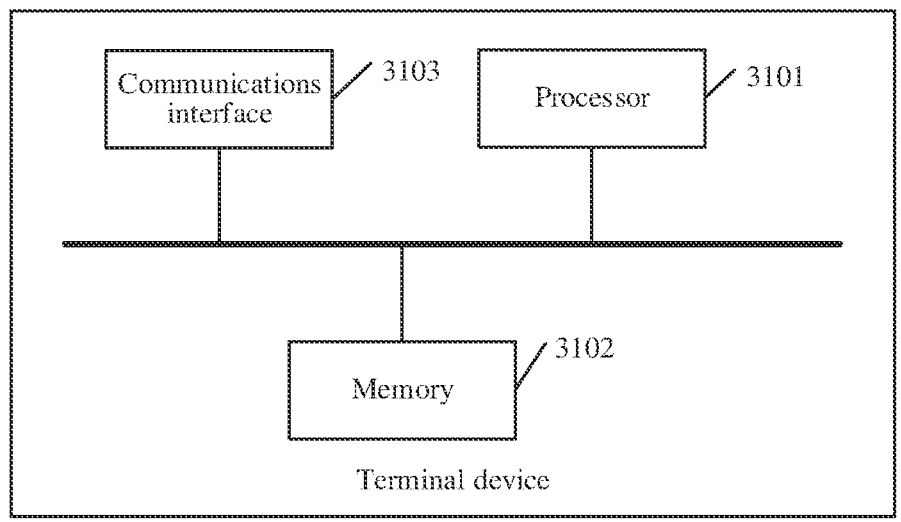
FIG. 31 is a schematic structural diagram of a terminal device according to an embodiment of this application.

FIG. 31 is a schematic structural diagram of a terminal device according to an embodiment of this application. The terminal device may be the terminal device shown in any one of FIG. 10 to FIG. 14 in the foregoing method embodiments. As shown in FIG. 31, the terminal device 3100 includes a processor 3101, a memory 3102, and a communications interface 3103. The processor 3101, the memory 3102, and the communications interface 3103 are connected.

The processor 3101 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. Alternatively, the processor 3101 may be a combination of processors implementing a computing function, for example, a combination of one or more microprocessors, or a combination of the DSP and a microprocessor.

The communications interface 3103 is configured to implement communication with other network elements (such as a terminal device and a master access network device).

The processor 3101 invokes program code stored in the memory 3102 to perform the steps that are performed by the terminal device described in any one of FIG. 10 to FIG. 14 in the foregoing method embodiments.

Principles of each device according to an embodiment of this application for resolving problems based on the same inventive concept are similar to those of a method embodiment in this application. Therefore, for implementation of each device, refer to implementation of a method. For brevity, details are not described herein again.

In the foregoing embodiments, the description of each embodiment has respective focuses. For a part that is not described in detail in an embodiment, refer to related descriptions in other embodiments.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method comprising:
configuring, by a master access network device, a first radio link control (RLC) entity of a split bearer in the master access network device with an unacknowledged mode (UM), wherein RLC entities of the split bearer are located in the master access network device, a secondary access network device, and a terminal device separately;
transmitting, by the master access network device, indication information to the secondary access network device, the indication information indicating that the split bearer is configured for duplicate transmission;
transmitting, by the master access network device, the indication information to the terminal device;
receiving, by the master access network device, first configuration information from the secondary access network device, the first configuration information indicating that a second RLC entity of the split bearer in the secondary access network device is configured with the UM; and
transmitting, by the master access network device, the first configuration information and second configuration information to the terminal device, the second configuration information indicating that the first RLC entity of the split bearer in the master access network device is configured with the UM.

2. The method according to claim 1, further comprising:
performing, by the master access network device after transmitting the indication information to the terminal device, the duplicate transmission over the split bearer with the terminal device according to the UM.

3. The method according to claim 1, wherein modes of a RLC entity of the split bearer includes an acknowledged mode (AM) and the UM, the RLC entity in the AM requests a packet retransmission in response to a packet loss being detected, and the RLC entity in the UM does not request a packet retransmission in response to a packet loss being detected.

4. A method comprising:
receiving, by a secondary access network device, indication information from a master access network device, the indication information indicating that a split bearer is configured for duplicate transmission, wherein radio link control (RLC) entities of the split bearer are located in the master access network device, the secondary access network device, and a terminal device separately;
configuring, by the secondary access network device based on the indication information, a first RLC entity of the split bearer in the secondary access network device with an unacknowledged mode (UM); and
transmitting, by the secondary access network device, first configuration information to the master access network device, the first configuration information indicating the first RLC entity of the split bearer in the secondary access network device is configured with the UM.

5. The method according to claim 4, further comprising:
performing, by the secondary access network device, the duplicate transmission over the split bearer with the terminal device based on the indication information and according to the UM.

6. The method according to claim 4, wherein modes of a RLC entity of the split bearer includes an acknowledged mode (AM) and the UM, the RLC entity in the AM requests a packet retransmission in response to a packet loss being detected, and the RLC entity in the UM does not request a packet retransmission in response to a packet loss being detected.

7. A method comprises:
receiving, by a terminal device, indication information from a master access network device, the indication information indicating that a split bearer is configured for duplicate transmission, wherein radio link control (RLC) entities of the split bearer are located in the master access network device, a secondary access network device, and the terminal device separately;
performing, by the terminal device, the duplicate transmission over the split bearer based on the indication information;
receiving, by the terminal device, first configuration information and second configuration information from the master access network device, the first configuration information indicating that a first RLC entity of the split bearer in the secondary access network device is configured with an unacknowledged mode (UM), and the second configuration information indicating that a second RLC entity of the split bearer in the master access network device is configured with the UM; and
configuring, by the terminal device, a third RLC entity of the split bearer in the terminal device with the UM.

8. The method according to claim 7, wherein modes of a RLC entity of the split bearer includes an acknowledged mode (AM) and the UM, the RLC entity in the AM requests a packet retransmission in response to a packet loss being detected, and the RLC entity in the UM does not request a packet retransmission in response to a packet loss being detected.

9. An apparatus comprising:
a non-transitory memory storage comprising instructions; and
one or more processors in communication with the memory storage, wherein the instructions, when executed by the one or more processors, cause the apparatus to:
configure a first radio link control (RLC) entity of a split bearer in a master access network device that the apparatus is used for with an unacknowledged mode (UM), wherein RLC entities of the split bearer are located in the master access network device, a secondary access network device, and a terminal device separately;
transmit indication information to the secondary access network device, the indication information indicating that the split bearer is configured for duplicate transmission;
transmit the indication information to the terminal device;
receive first configuration information from the secondary access network device, the first configuration information indicating that a second RLC entity of the split bearer in the secondary access network device is configured with the UM; and
transmit the first configuration information and second configuration information to the terminal device, the second configuration information indicating that the first RLC entity of the split bearer in the master access network device is configured with the UM.

10. The apparatus according to claim 9, wherein the instructions, when executed by the one or more processors, further cause the apparatus to:

perform, after transmitting the indication information to the terminal device, the duplicate transmission over the split bearer with the terminal device according to the UM.

11. The apparatus according to claim 9, wherein modes of a RLC entity of the split bearer includes an acknowledged mode (AM) and the UM, the RLC entity in the AM requests a packet retransmission in response to a packet loss being detected, and the RLC entity in the UM does not request a packet retransmission in response to a packet loss being detected.

12. An apparatus comprising:
a non-transitory memory storage comprising instructions; and
one or more processors in communication with the memory storage, wherein the instructions, when executed by the one or more processors, cause the apparatus to:
receive indication information from a master access network device, the indication information indicating that a split bearer is configured for duplicate transmission, wherein radio link control (RLC) entities of the split bearer are located in the master access network device, a secondary access network device that the apparatus is used for, and a terminal device separately;
configure, based on the indication information, a RLC entity of the split bearer in the secondary access network device with an unacknowledged mode (UM); and
transmit first configuration information to the master access network device, the first configuration information indicating that the RLC entity of the split bearer in the secondary access network device is configured with the UM.

13. The apparatus according to claim 12, wherein the instructions, when executed by the one or more processors, further cause the apparatus to:
perform the duplicate transmission over the split bearer with the terminal device based on the indication information and according to the UM.

14. The apparatus according to claim 12, wherein modes of a RLC entity of the split bearer includes an acknowledged mode (AM) and an UM, the RLC entity in the AM requests a packet retransmission in response to a packet loss being detected, and the RLC entity in the UM does not request a packet retransmission in response to a packet loss being detected.

15. An apparatus comprising:
a non-transitory memory storage comprising instructions; and
one or more processors in communication with the memory storage, wherein the instructions, when executed by the one or more processors, cause the apparatus to:
receive indication information from a master access network device, the indication information indicating that a split bearer is configured for duplicate transmission, wherein radio link control (RLC) entities of the split bearer are located in the master access network device, a secondary access network device, and a terminal device that the apparatus is used for separately;
perform the duplicate transmission over the split bearer based on the indication information;
receive first configuration information and second configuration information from the master access network device, the first configuration information indicating that a first RLC entity of the split bearer in the secondary access network device is configured with an unacknowledged mode (UM), and the second configuration information indicating that a second RLC entity of the split bearer in the master access network device is configured with the UM; and
configure a third RLC entity of the split bearer in the terminal device with the UM.

16. The apparatus according to claim 15, wherein modes of a RLC entity of the split bearer includes an acknowledged mode (AM) and the UM, the RLC entity in the AM requests a packet retransmission in response to a packet loss being detected, and the RLC entity in the UM does not request a packet retransmission in response to a packet loss being detected.

* * * * *